US008941719B2

(12) United States Patent
Takayama et al.

(10) Patent No.: US 8,941,719 B2
(45) Date of Patent: Jan. 27, 2015

(54) ELECTRONIC APPARATUS AND DISPLAY CONTROL METHOD

(75) Inventors: Shunsuke Takayama, Tachikawa (JP); Yuuichiro Aso, Hamura (JP); Miku Hamada, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 13/398,398

(22) Filed: Feb. 16, 2012

(65) Prior Publication Data

US 2012/0249734 A1 Oct. 4, 2012

(30) Foreign Application Priority Data

Mar. 28, 2011 (JP) ................. 2011-070800
Apr. 19, 2011 (JP) ................. 2011-093413

(51) Int. Cl.
*H04N 13/04* (2006.01)
*H04N 13/00* (2006.01)
*G06F 3/00* (2006.01)
*G06F 1/16* (2006.01)

(52) U.S. Cl.
CPC ....... *H04N 13/0456* (2013.01); *H04N 13/0062* (2013.01); *H04N 13/0497* (2013.01); *G06F 1/1637* (2013.01)
USPC ................. 348/43; 348/51; 715/760

(58) Field of Classification Search
USPC .................................. 348/41–161
See application file for complete search history.

(56) References Cited

U.S. PATENT DOCUMENTS

| 5,315,377 A | 5/1994 | Isono et al. |
| 6,285,368 B1 | 9/2001 | Sudo |
| 7,369,102 B2 | 5/2008 | Luke et al. |
| 7,986,374 B2 | 7/2011 | Ijzerman et al. |
| 2004/0174398 A1 | 9/2004 | Luke et al. |
| 2009/0033812 A1 | 2/2009 | Ijzerman et al. |

(Continued)

FOREIGN PATENT DOCUMENTS

| JP | H 05122733 | 5/1993 |
| JP | H 05284542 | 10/1993 |

(Continued)

OTHER PUBLICATIONS

Japanese Patent Application No. 2011-093413, First Office Action, mailed May 29, 2012, (with English Translation).

(Continued)

*Primary Examiner* — Joseph Ustaris
*Assistant Examiner* — Talha Nawaz
(74) *Attorney, Agent, or Firm* — Blakely, Sokoloff, Taylor & Zafman LLP

(57) ABSTRACT

According to one embodiment, an electronic apparatus, which is capable of setting areas in a screen in either a 3D mode or a 2D mode, includes a 3D video display module, a candidate area calculation module, a 2D area determination module, and a 2D video display module. The 3D video display module displays 3D video on a 3D area in the 3D mode. The candidate area calculation module calculates, upon receiving a request for displaying 2D video, a first candidate area for displaying the 2D video, based on a position of the 3D area. The 2D area determination module determines the first candidate area to be a 2D area for displaying the 2D video if the first candidate area falls within the screen and is in the 3D mode. The 2D video display module displays the 2D video on the 2D area set in the 2D mode.

14 Claims, 20 Drawing Sheets

(56) References Cited

U.S. PATENT DOCUMENTS

| | | | |
|---|---|---|---|
| 2010/0313172 A1 | 12/2010 | Hirahara | |
| 2010/0315493 A1* | 12/2010 | Hamada | 348/51 |
| 2010/0321472 A1* | 12/2010 | Kuwabara et al. | 348/43 |
| 2011/0050870 A1* | 3/2011 | Hanari | 348/56 |
| 2011/0063422 A1* | 3/2011 | Yoo | 348/54 |
| 2011/0157329 A1* | 6/2011 | Huang et al. | 348/54 |
| 2011/0161843 A1* | 6/2011 | Bennett et al. | 715/760 |
| 2011/0249091 A1* | 10/2011 | Kishimoto | 348/43 |
| 2011/0254917 A1* | 10/2011 | Schaffer et al. | 348/43 |
| 2011/0261157 A1* | 10/2011 | Kiyama | 348/43 |

FOREIGN PATENT DOCUMENTS

| | | |
|---|---|---|
| JP | 07-236164 | 9/1995 |
| JP | H 10224825 | 8/1998 |
| JP | 2001216067 | 8/2001 |
| JP | 2004272906 | 9/2004 |
| JP | 2007-213081 | 8/2007 |
| JP | 2009-091643 | 4/2009 |
| JP | 2009-516205 | 4/2009 |
| JP | 2009528565 | 8/2009 |
| JP | 2010282136 | 12/2010 |

OTHER PUBLICATIONS

Japanese Patent Application No. 2012-200901, First Office Action, mailed Jul. 2, 2013, (with English Translation).

* cited by examiner

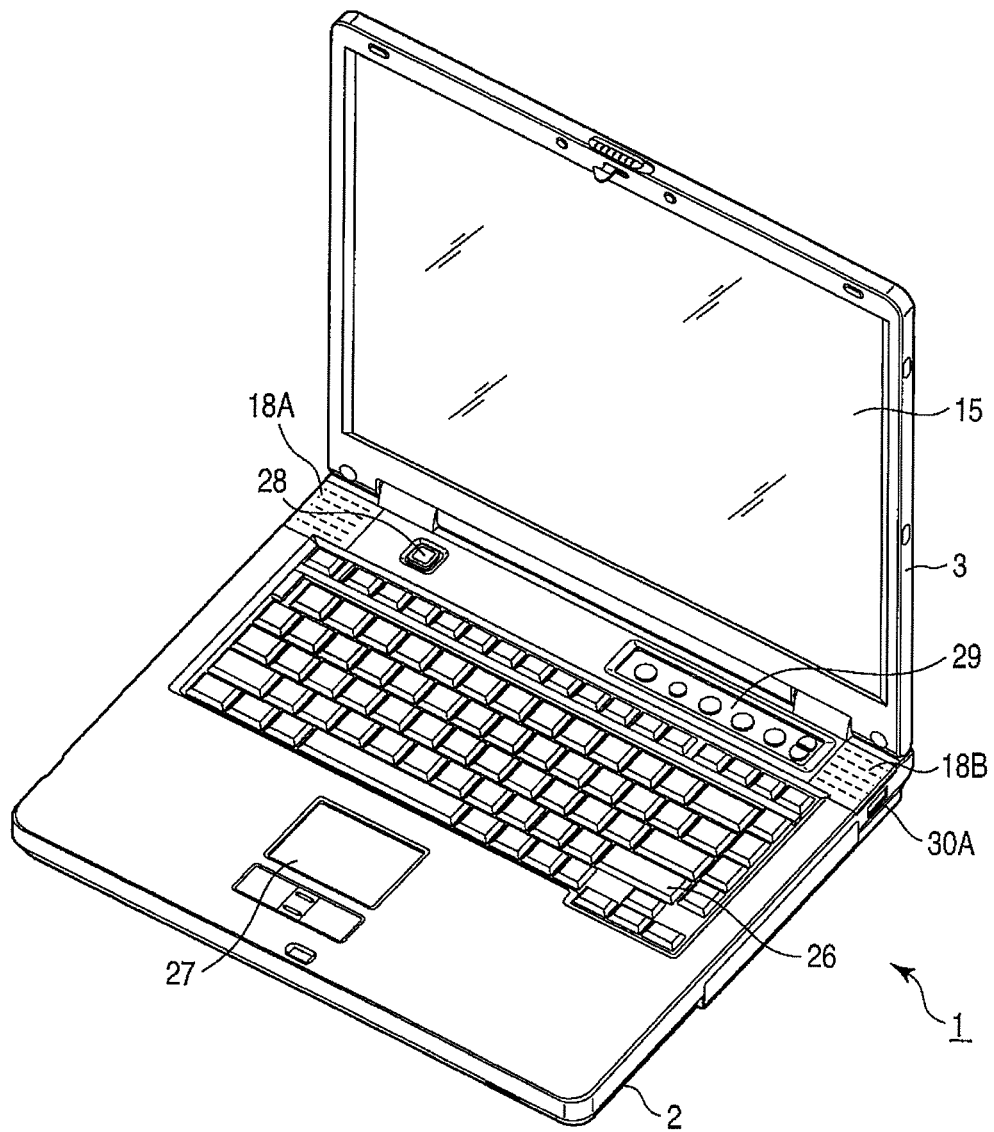
F I G. 1

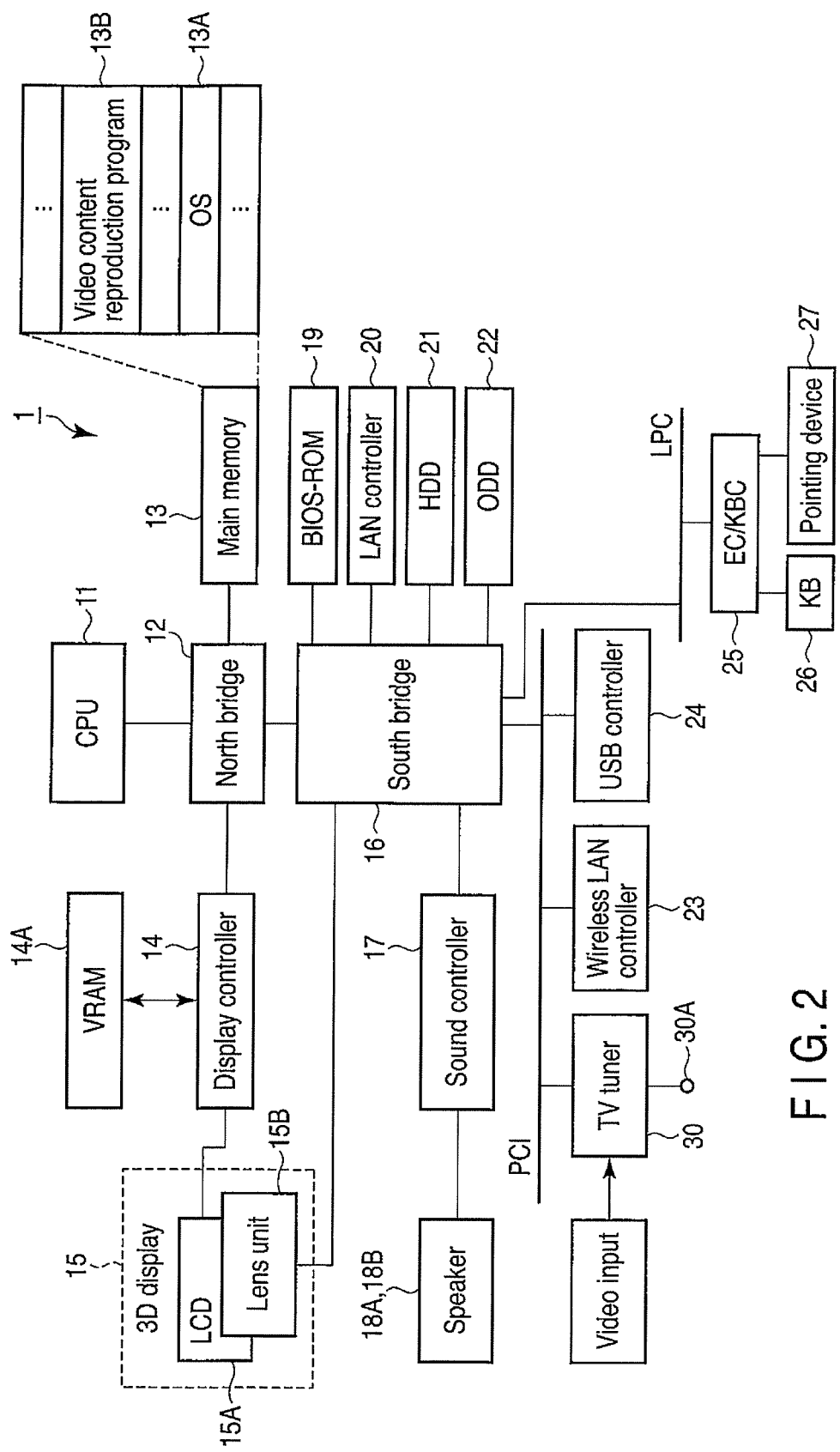
F I G. 2

| Priority | Area information |
|---|---|
| 1 | Rectangular area of (40%, 75%), (60%, 75%), (60%, 85%), (40%, 85%), within video display area — 63A |
| 2 | Area of 10% of screen height, on lower side neighboring video display area — 63B |
| 3 | Area of 15% of screen width, on right side neighboring video display area — 63C |
| 4 | Area of 10% of screen height, on upper side neighboring video display area — 63D |
| 5 | Area of 15% of screen width, on left side neighboring video display area — 63E |
| ⋮ | ⋮ |

FIG. 4

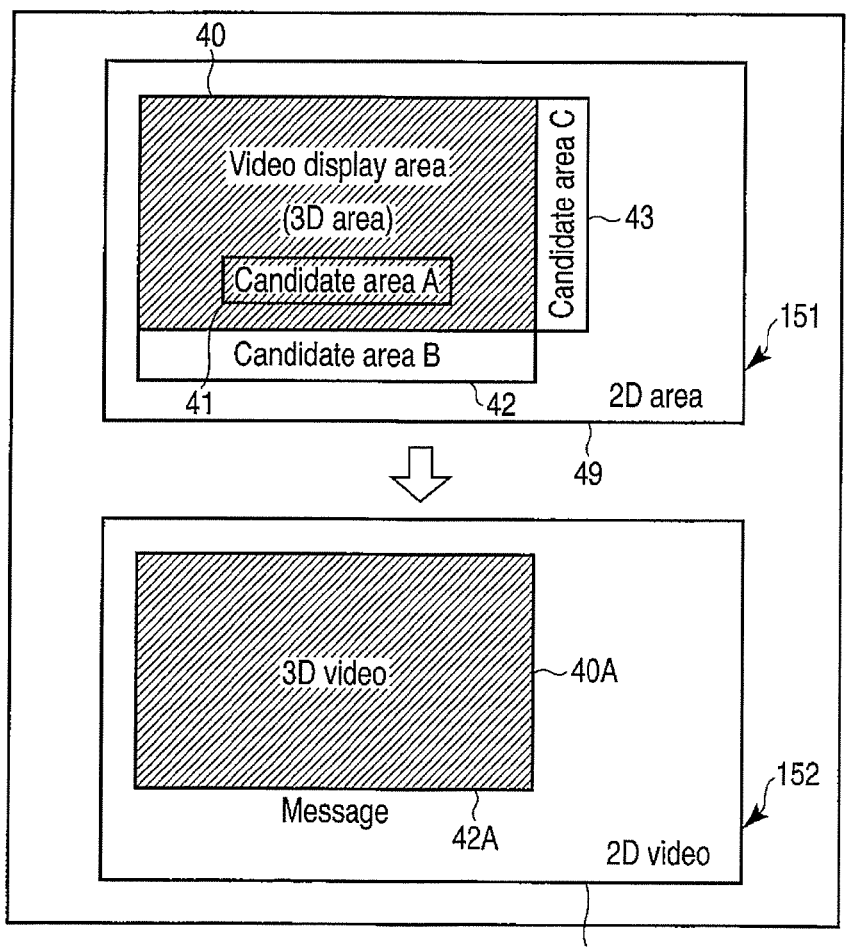

FIG. 5

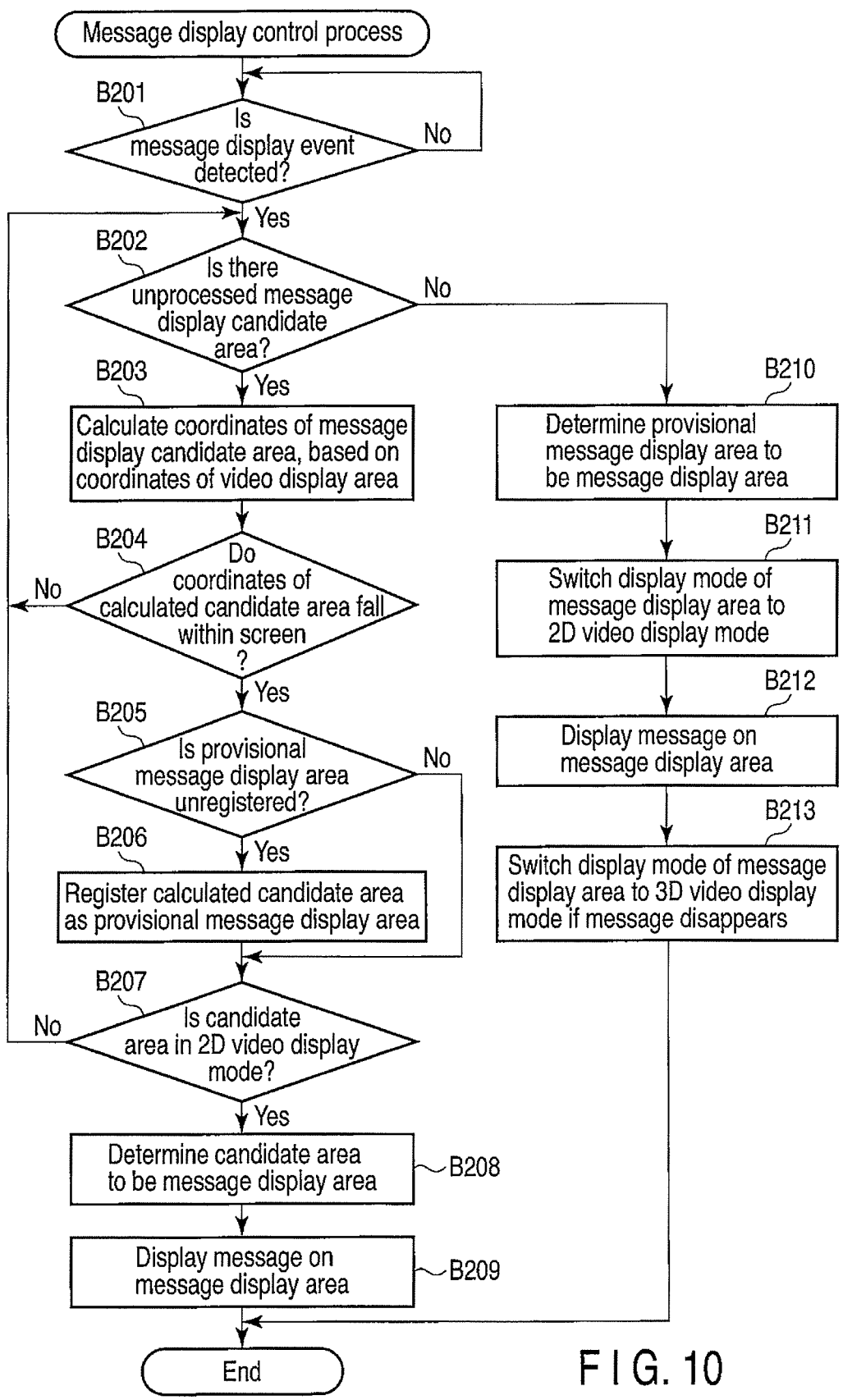
F I G. 10

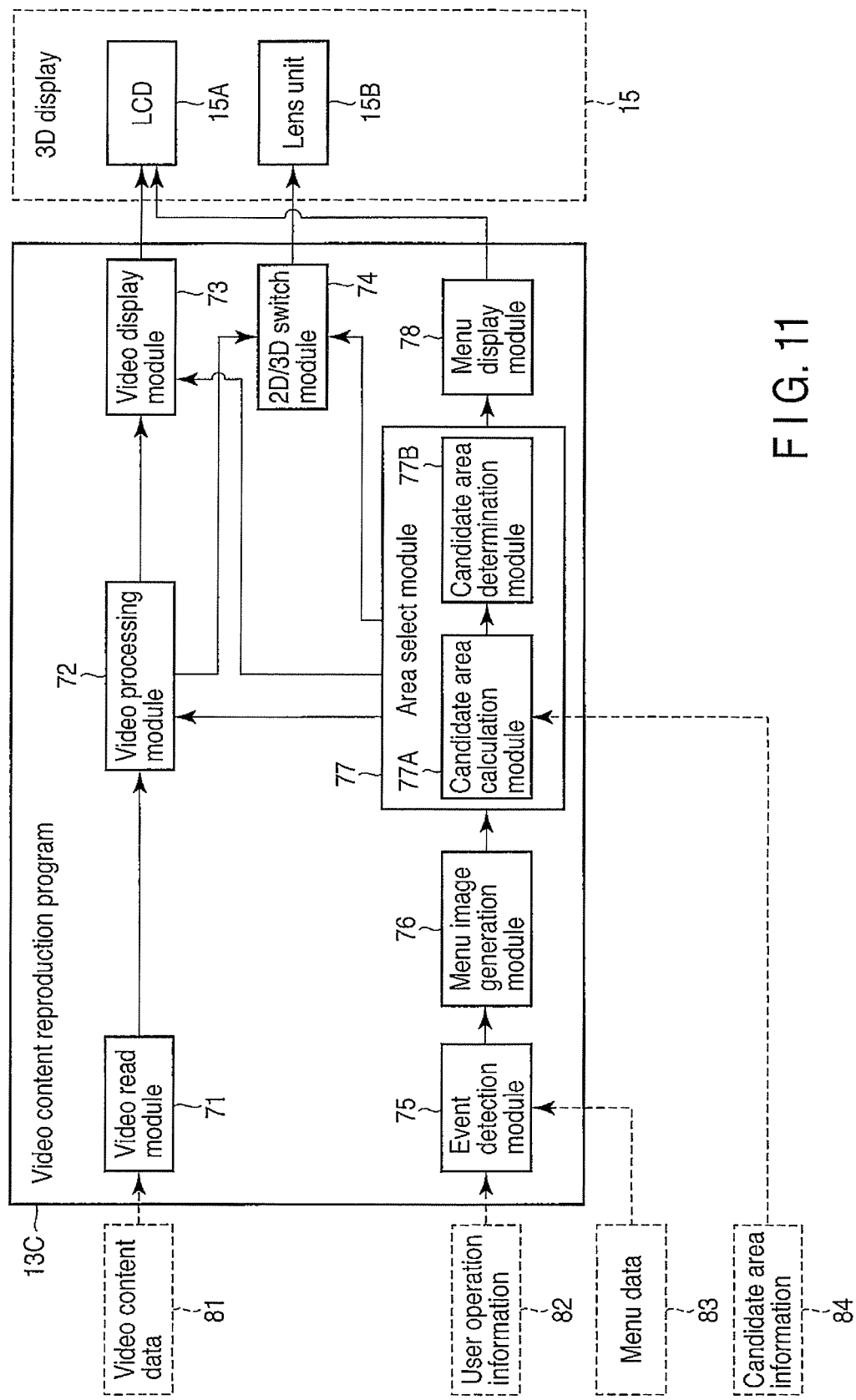
F I G. 11

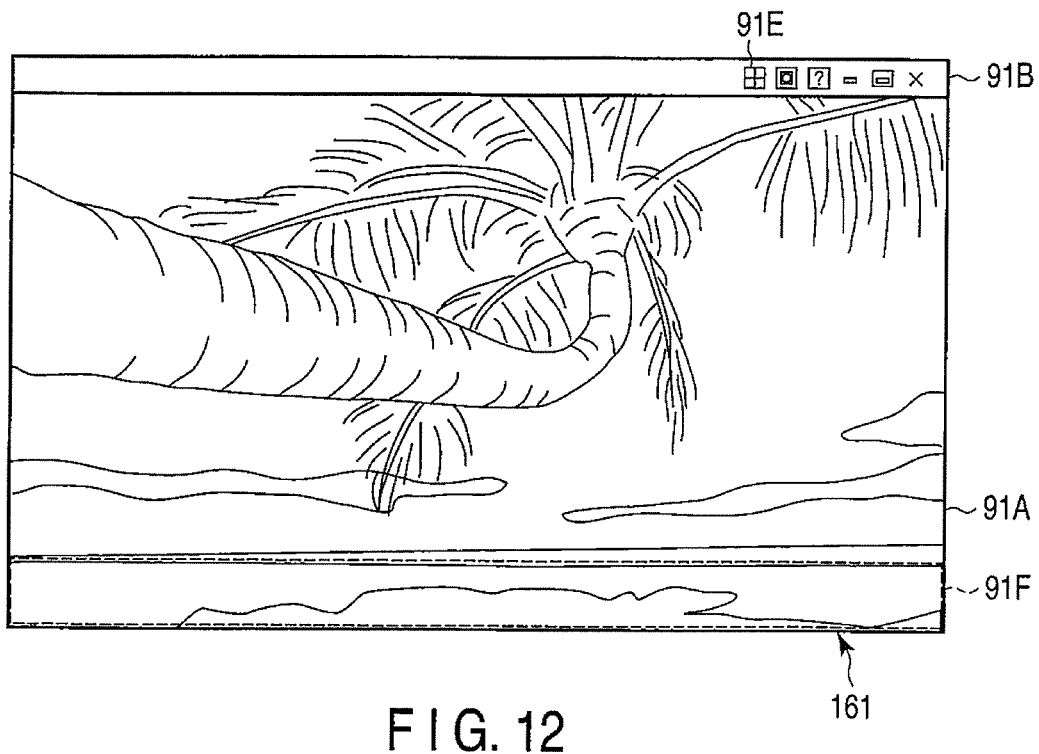
F I G. 12
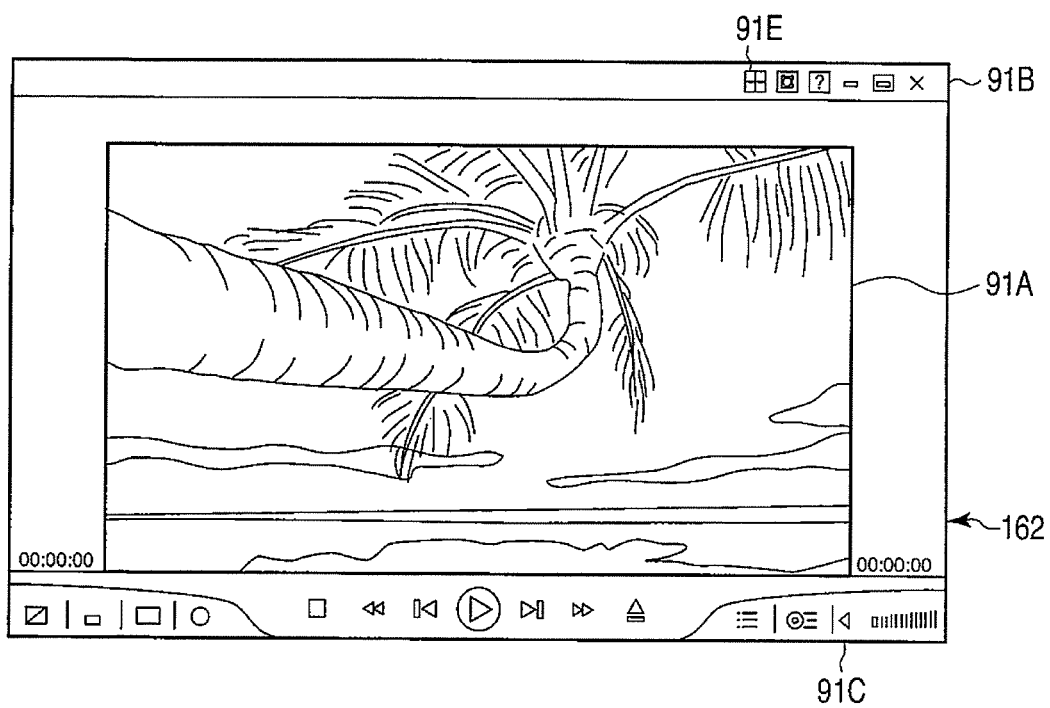
F I G. 13

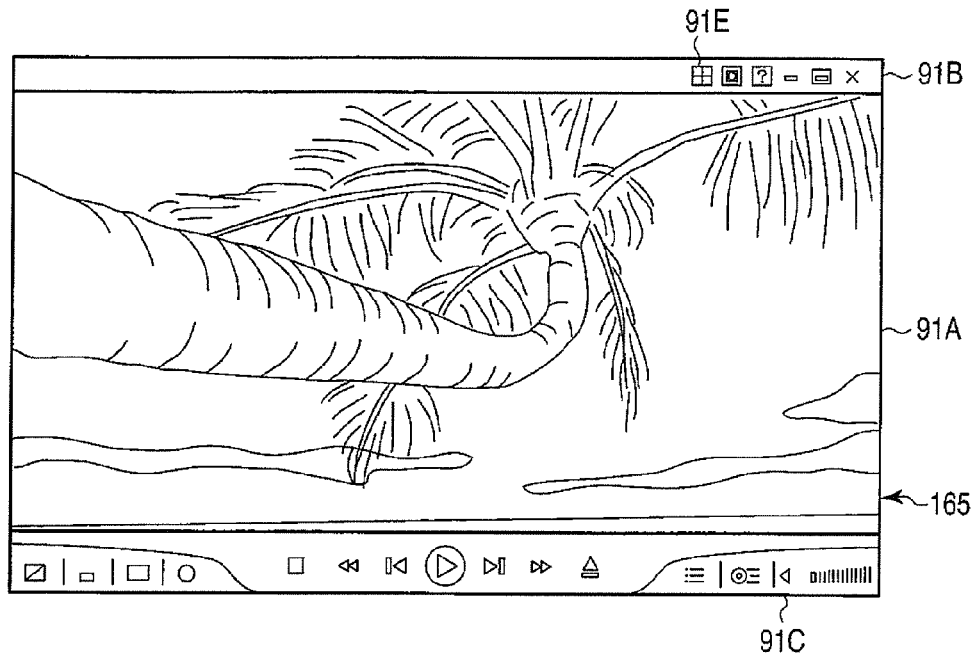
F I G. 16
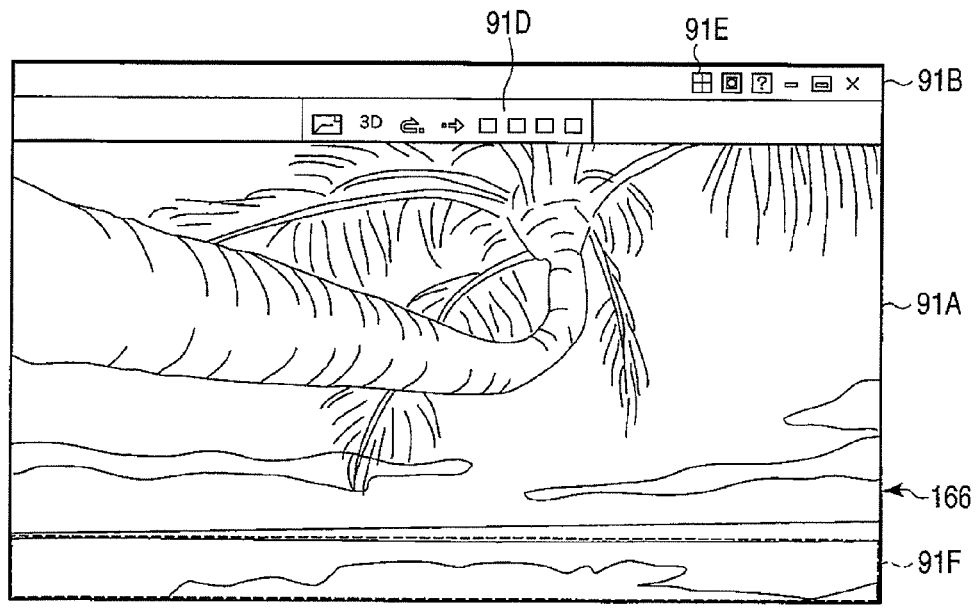
F I G. 17

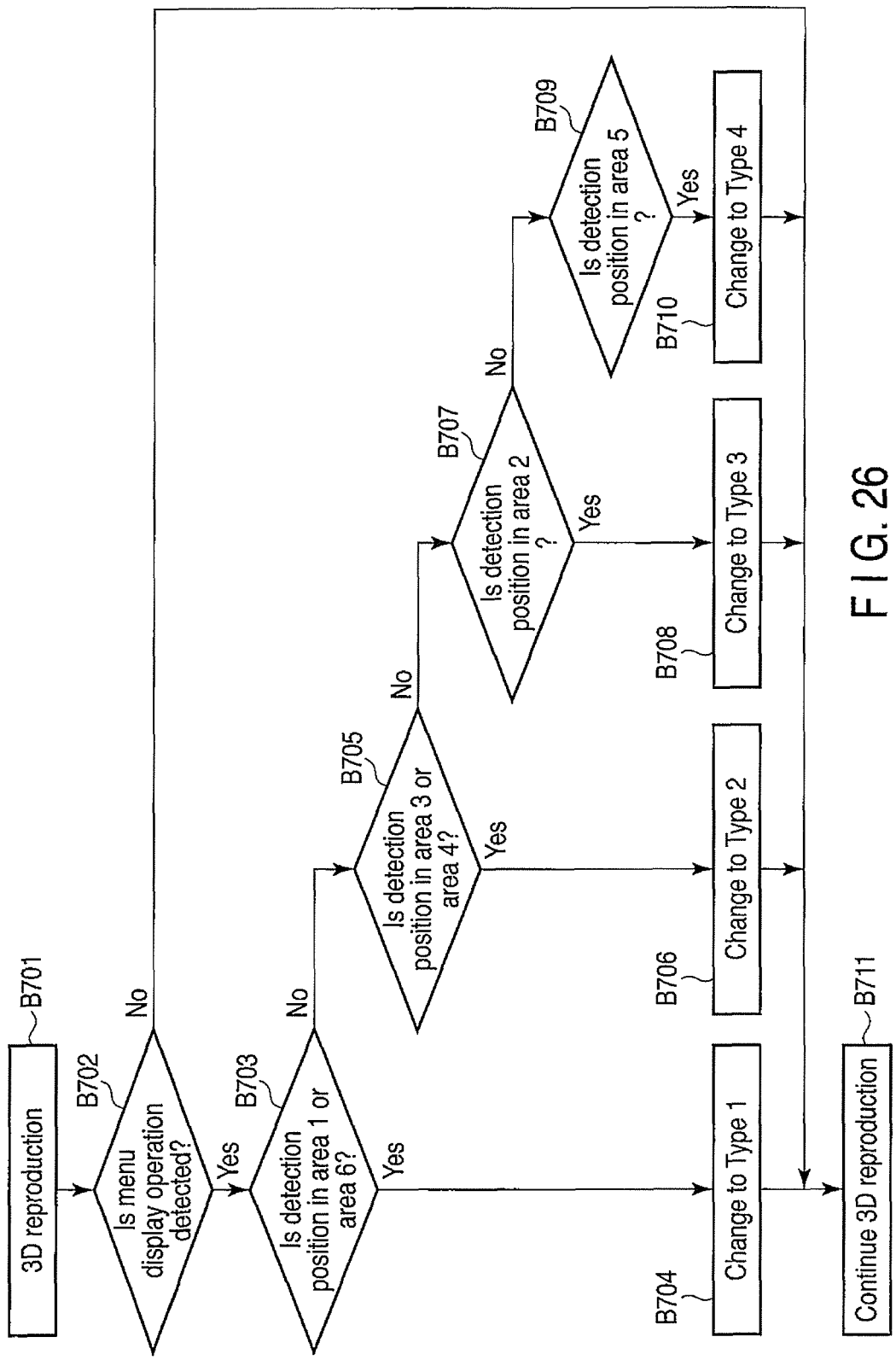
F I G. 26

ELECTRONIC APPARATUS AND DISPLAY CONTROL METHOD

CROSS-REFERENCE TO RELATED APPLICATIONS

This application is based upon and claims the benefit of priority from prior Japanese Patent Applications No. 2011-070800, filed Mar. 28, 2011; and No. 2011-093413, filed Apr. 19, 2011, the entire contents of all of which are incorporated herein by reference.

FIELD

Embodiments described herein relate generally to an electronic apparatus which reproduces three-dimensional (3D) video content, and a display control method which is applied to the electronic apparatus.

BACKGROUND

In recent years, there are provided various video display apparatuses for viewing 3D video. An example of such video display apparatuses is a video display apparatus by a naked-eye stereoscopic method (naked-eye 3D method). In the naked-eye stereoscopic method, for example, a left-eye video image and a right-eye video image are simultaneously displayed on a liquid crystal display (LCD) (space-division method), and the directions of emission of light rays corresponding to the pixels in these video images are controlled by lenses which are disposed on the LCD (lenticular method). Thereby, a user can view pixels of the left-eye video image by the left eye and pixels of the right-eye video image by the right eye, thus being able to perceive 3D video (stereoscopic video).

When 3D video is viewed, it is possible that a 2D video image, such as an error message or an operation screen for input by the user, is displayed on the screen. In the video display apparatus by the naked-eye stereoscopic method, for example, a left-eye video image and a right-eye video image are generated by using 2D video corresponding to a message or a menu. Specifically, for example, video, in which 2D video images corresponding to the message or menu are interleaved, is used for both the left-eye video image and right-eye video image. By viewing the left-eye video image and right-eye video image displayed on the screen, the user can perceive the message or menu, which is expressed two-dimensionally in a pseudo-manner.

However, since the message or menu, which is to be displayed as 2D video, is displayed as the interleaved left-eye video image and right-eye video image, the user perceives video with a lower resolution than the original 2D video, and it is possible that the user feels difficulty in visually recognizing the message or menu. For example, in the message displayed by the above-described method, since the resolution lowers, it is possible that a part of characters included in the message appears to be missing.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating the external appearance of an electronic apparatus according to a first embodiment.

FIG. 2 is an exemplary block diagram illustrating the configuration of the electronic apparatus of the first embodiment.

FIG. 4 shows a structure example of candidate area information which is used by the video content reproduction program which is executed by the electronic apparatus of the first embodiment.

FIG. 5 shows an example of a message which is displayed by the electronic apparatus of the first embodiment.

FIG. 10 is a flowchart illustrating an example of the procedure of a message display control process which is executed by the electronic apparatus of the first embodiment.

FIG. 11 is an exemplary block diagram illustrating the functional configuration of a video content reproduction program which is executed by an electronic apparatus of a second embodiment.

FIG. 12 shows a first example of a screen which is displayed by the electronic apparatus of the second embodiment.

FIG. 13 shows a second example of the screen which is displayed by the electronic apparatus of the second embodiment.

FIG. 16 shows a fifth example of the screen which is displayed by the electronic apparatus of the second embodiment.

FIG. 17 shows a sixth example of the screen which is displayed by the electronic apparatus of the second embodiment.

FIG. 26 is a flowchart illustrating an example of the procedure of a screen structure determination process which is executed by the electronic apparatus of the second embodiment.

DETAILED DESCRIPTION

Figure 3:
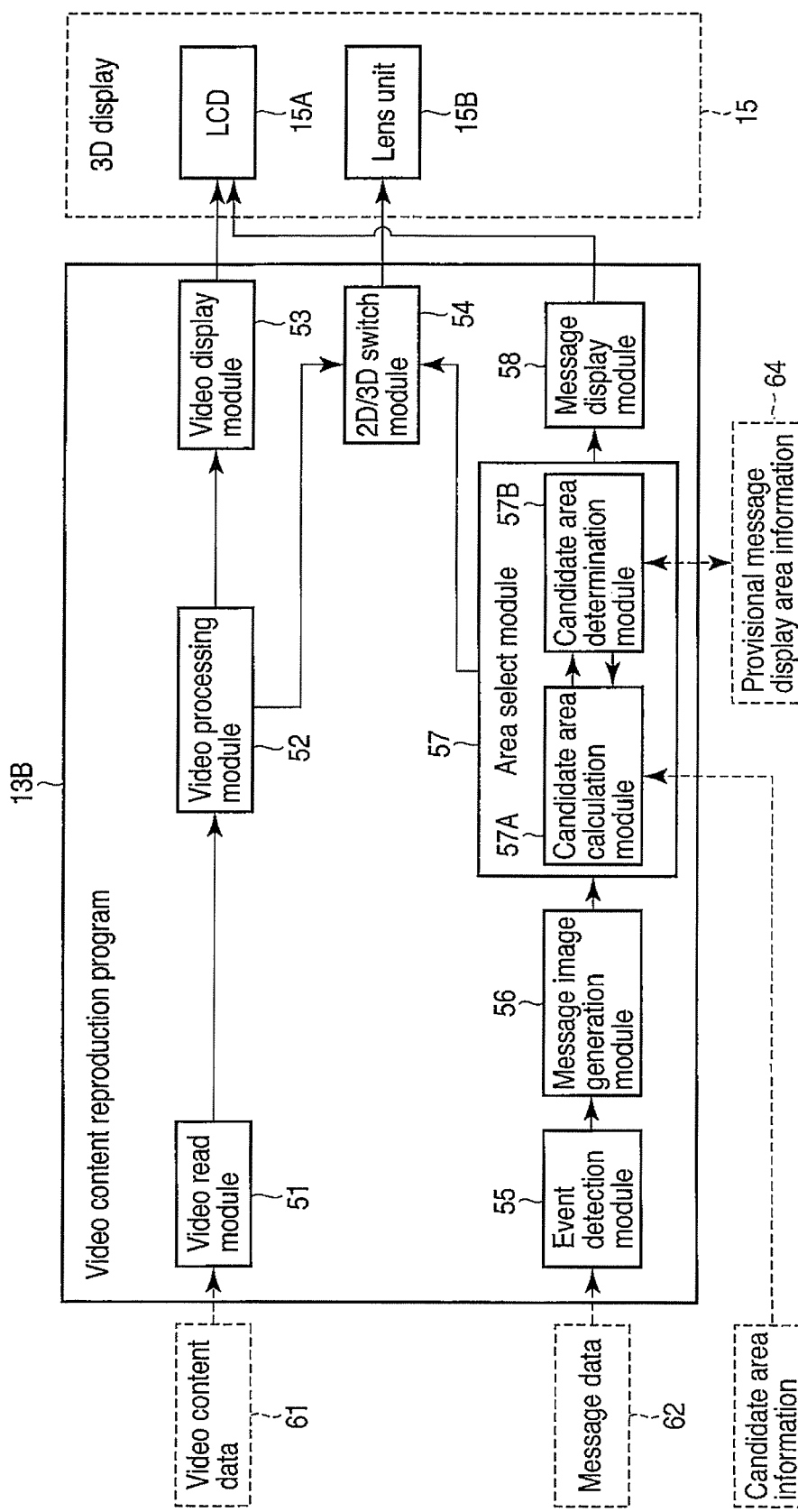
FIG. 3 is an exemplary block diagram illustrating the functional configuration of a video content reproduction program which is executed by the electronic apparatus of the first embodiment.

Various embodiments will be described hereinafter with reference to the accompanying drawings.

In general, according to one embodiment, an electronic apparatus which is capable of setting each of a plurality of areas in either a three-dimensional video display mode or a two-dimensional video display mode, the plurality of areas being set in a screen, the apparatus includes a three-dimensional video display module, a candidate area calculation module, a two-dimensional video display area determination module, a mode setting module, and a two-dimensional video display module. The three-dimensional video display module displays three-dimensional video on a three-dimensional video display area in the screen, the three-dimensional video display area being set in the three-dimensional video display mode. The candidate area calculation module calculates, upon receiving a request for displaying two-dimensional video during a period in which the three-dimensional video is being displayed, a first candidate area for displaying the two-dimensional video, based on a position of the three-dimensional video display area. The two-dimensional video display area determination module determines the first candidate area to be a two-dimensional video display area for displaying the two-dimensional video if the first candidate area falls within the screen and is set in the three-dimensional video display mode. The mode setting module sets the two-dimensional video display area in the two-dimensional video display mode. The two-dimensional video display module displays the two-dimensional video on the two-dimensional video display area.

FIG. 1 is an exemplary perspective view showing the external appearance of an electronic apparatus according to a first embodiment. The electronic apparatus is realized, for example, as a notebook-type personal computer (PC) 1. In addition, this electronic apparatus may be realized as a television receiver, a personal video recorder for recording and playing video data (e.g. a hard disk recorder or a DVD recorder), a tablet PC, a slate PC, a PDA, a car navigation apparatus, or a smartphone.

As shown in FIG. 1, the computer 1 includes a computer main body 2 and a display unit 3.

A three-dimensional display (3D display) 15 is built in the display unit 3. The display unit 3 is attached to the computer main body 2 such that the display unit 3 is rotatable between an open position where the top surface of the computer main body 2 is exposed, and a closed position where the top surface of the computer main body 2 is covered. In addition, the 3D display 15 includes a liquid crystal display (LCD) 15A and a lens unit 15B. The lens unit 15B is attached on the LCD 15A. The lens unit 15B includes a plurality of lens mechanisms for emitting, in predetermined directions, a plurality of light rays corresponding to a plurality of pixels in a video image that is displayed on the LCD 15A. The lens unit 15B is, for example, a liquid crystal gradient index (GRIN) lens which can electrically switch functions necessary for 3D video display. In the liquid crystal GRIN lens, a refractive index distribution is created by electrodes with use of a planar liquid crystal layer. Thus, for example, a designated area in the screen can display 3D video, and the other area can display 2D video. Specifically, by varying the refractive index between the area which displays 3D video and the area which displays 2D video, a 3D video display mode for displaying 3D video and a 2D video display mode for displaying 2D video can be switched partly within the screen. In the area set in the 3D video display mode, the refractive index is varied so that 3D video including left-eye video and right-eye video, which is to be displayed in this area, may have a parallax corresponding to an eye separation distance or a viewing distance. In the area set in the 2D video display mode, the refractive index is varied so that 2D video, which is to be displayed in this area, may be displayed as such, without being refracted. In the 3D display 15, each of a plurality of areas having arbitrary positions and sizes, which are set in the screen, can be set in either the 3D video display mode or 2D video display mode.

The 3D display 15 displays left-eye video and right-eye video on the area of the 3D video display mode, and displays 2D video on the area of the 2D video display mode. Thus, the user can perceive 3D video when viewing the area of the 3D video display mode, and can perceive 2D video when viewing the area of the 2D video display mode.

The computer main body 2 has a thin box-shaped housing. A keyboard 26, a power button 28 for powering on/off the computer 1, an input operation panel 29, a touchpad 27, and speakers 18A and 18B are disposed on the top surface of the housing of the computer main body 2. Various operation buttons are provided on the input operation panel 29. The buttons include operation buttons for controlling a TV function (viewing, recording and reproduction of recorded broadcast program data/video data).

An antenna terminal 30A for TV broadcast is provided, for example, on a right-side surface of the computer main body 2. In addition, an external display connection terminal supporting, e.g. the high-definition multimedia interface (HDMI) standard is provided, for example, on a rear surface of the computer main body 2. This external display connection terminal is used for outputting video data (moving picture data) included in video content data, such as broadcast program data, to an external display.

FIG. 2 shows the system configuration of the computer 1.

The computer 1, as shown in FIG. 2, includes a CPU 11, a north bridge 12, a main memory 13, a display controller 14, a video memory (VRAM) 14A, 3D display 15, a south bridge 16, a sound controller 17, speakers 18A and 18B, a BIOS-ROM 19, a LAN controller 20, a hard disk drive (HDD) 21, an optical disc drive (ODD) 22, a wireless ZAN controller 23, a USB controller 24, an embedded controller/keyboard controller (EC/KBC) 25, keyboard (KB) 26, pointing device 27, and a TV tuner 30.

The CPU 11 is a processor for controlling the operation of the computer 1. The CPU 11 executes an operating system (OS) 13A and an application program, such as a video content reproduction program 13B, which are loaded from the HDD 21 into the main memory 13. The video content reproduction program 13B is software having a function for viewing video content data. The video content reproduction program 13B executes a live reproduction process for viewing broadcast program data which is received by the TV tuner 30, a recording process for recording the received broadcast program data in the HDD 21, a reproduction process for reproducing broadcast program data/video data which is recorded in the HDD 21, and a reproduction process for reproducing video content data which is received via a network. In addition, the video content reproduction program 13B can reproduce video content data which is stored in storage media such as a DVD, or in a storage device such as a hard disk.

Further, the video content reproduction program 13B includes a function for viewing 3D video. The video content reproduction program 13B converts 2D video, which is included in video content data, to 3D video in real time, and displays the 3D video on the screen (the screen of the 3D display) 15. The video content reproduction program 13B can 2D to 3D convert (2D-3D convert) various content data (e.g. broadcast program data, video data stored in storage media or storage devices, or video data received from a server on the Internet).

For the display of 3D video, use may be made of the 3D display 15 by a naked-eye stereoscopic method (e.g. an integral imaging method, a lenticular method, or a parallax barrier method). The user can perceive 3D video by the naked eyes by viewing video which is displayed on the 3D display 15 by the naked-eye stereoscopic method.

Besides, the video content reproduction program 13B has a message display control function of controlling the display of a message which is presented to the user while video content data is being viewed. This message is, for instance, a message for notifying an error or a status, a subtitle, a closed caption, or a control panel for operation, the display of which is requested by the OS 13A or various application programs such as the video content reproduction program 13B.

In the video display apparatus by the naked-eye stereoscopic method, for example, a left-eye message image and a right-eye message image are generated by using 2D images corresponding to the message. Specifically, for example, an image, in which 2D images corresponding to the message are interleaved in every scanning line, is used as both the left-eye message image and right-eye message image. In short, the same interleaved image is used as the left-eye message image and right-eye message image. By viewing the left-eye message image and right-eye message image which are displayed on the screen, the user can perceive the message which is expressed two-dimensionally in a pseudo-manner. However, since the message, which is to be displayed as a 2D image, is displayed as the interleaved left-eye message image and right-eye message image, the user perceives video with a lower resolution than the original 2D image, and it is possible that the user feels difficulty in visually recognizing the message or menu. For example, in the message that is displayed by the above-described method, since the resolution lowers, it is possible that a part of characters included in the message appears to be missing. In addition, the message may be displayed at such a position as to hinder the viewing of video, for example, at a central position on the screen 15 or at a position on a video image which is being viewed.

Thus, by the message display control function, the video content reproduction program 13B displays the message as 2D video (i.e. a 2D image frame) while the user is viewing 3D video. In addition, the video content reproduction program 13B displays the message at a position which is easy for visual recognition and does not substantially hinder the viewing of 3D video while the 3D video is being viewed.

Besides, the CPU 11 executes a Basic Input/Output System (BIOS) that is stored in the BIOS-ROM 19. The BIOS is a program for hardware control.

The north bridge 12 is a bridge device which connects a local bus of the CPU 11 and the south bridge 16. The north bridge 12 includes a memory controller which access-controls the main memory 13. The north bridge 12 also has a function of communicating with the display controller 14.

The display controller 14 is a device which controls the LCD 15A that is used as a display of the computer 1. A display signal, which is generated by the display controller 14, is sent to the LCD 15A. The LCD 15A displays video, based on the display signal.

The south bridge 16 controls devices on a Peripheral Component Interconnect (PCI) bus and devices on a Low Pin Count (LPC) bus. The south bridge 16 includes an Integrated Drive Electronics (IDE) controller for controlling the HDD 21 and ODD 22, and a memory controller which access-controls the BIOS-ROM 19. The south bridge 16 also has a function of communicating with the sound controller 17 and LAN controller 20.

Furthermore, the south bridge 16 can output to the lens unit 15B a control signal for executing such control as to set each of plural areas in the lens unit 15B in either the 3D video display mode or the 2D video display mode, in accordance with, e.g. a request by the video content reproduction program 13B. In accordance with the control signal which has been output by the south bridge 16, the lens unit 15B varies, for example, the refractive index of that part of the liquid crystal layer, which corresponds to each of the plural areas, thereby setting each area in either the 3D video display mode or the 2D video display mode.

The sound controller 17 is a sound source device and outputs audio data, which is a target of reproduction, to the speakers 18A and 18B. The LAN controller 20 is a wired communication device which executes wired communication of, e.g. the Ethernet (trademark) standard. The wireless LAN controller 23 is a wireless communication device which executes wireless communication of, e.g. the IEEE 802.11 standard. In addition, the USB controller 24 communicates with an external device via a cable of, e.g. the USB 2.0 standard.

The EC/KBC 25 is a one-chip microcomputer in which an embedded controller for power management and a keyboard controller for controlling the keyboard (KB) 26 and pointing device 27 are integrated. The EC/KBC 25 has a function of powering on/off the computer 1 in accordance with the user's operation.

The TV tuner 30 is a reception device which receives broadcast program data that is broadcast by a television broadcast signal, and the TV tuner 30 is connected to the antenna terminal 30A. The TV tuner 30 is realized as a digital TV tuner which can receive digital broadcast program data of, e.g. terrestrial digital TV broadcast. In addition, the TV tuner 30 has a function of capturing video data which is input from an external device.

FIG. 3 is a block diagram illustrating an example of the functional configuration of the video content reproduction program 13B. The video content reproduction program 13B has a video reproduction function for reproducing video content data 61 as 3D video or 2D video. In addition, the video content reproduction program 13B has a message display control function for displaying various messages, which are displayed during a period in which video is being reproduced, so that the user may easily visually recognize the messages.

The video content reproduction program 13B includes a video read module 51, a video processing module 52, a video display module 53, a 2D/3D switch module 54, an event detection module 55, a message image generation module 56, an area select module 57, and a message display module 58. The video read module 51, video processing module 52, video display module 53, and 2D/3D switch module 54 realize the video reproduction function. The event detection module 55, message image generation module 56, area select module 57, message display module 58, and 2D/3D switch module 54 realize the message display control function. The structure for the video reproduction function and the structure for the message display control function will be described below.

To begin with, the structure for the video reproduction function is described.

The video read module 51 reads the video content data 61 from, for example, storage media such as a DVD, or from a storage device such as the HDD 21. In the meantime, the video read module 51 may receive the video content data 61 via the TV tuner 30 or LAN controller 20, 23. The video content data 61 includes 2D video data for displaying 2D video, or 3D video data for displaying 3D video. Such video data is, for example, compression-encoded video data (e.g. MPEG). In this case, the video data is decoded and then used. In addition, the video content data 61 may include various metadata. The video read module 51 outputs the read (received) video content data 61 to the video processing module 52.

The video processing module 52 generates video data by using the video content data 61 which has been output by the video read module 51. Specifically, the video processing module 52 first determines whether video is to be displayed in either the 2D video display mode or the 3D video display mode. For example, if 3D video data is included in the video content data 61, the video processing module 52 determines that video is to be displayed in the 3D video display mode. In addition, the video processing module 52 determines that video is to be displayed in a display mode which is designated by the user. The user selects the video display mode, for example, by using an operation screen including a button for selecting either the 2D video display mode or the 3D video display mode.

When it has been determined that video is displayed in the 3D video display mode and when 3D video data is included in the video content data 61, the video processing module 52 generates left-eye video data and right-eye video data by using the 3D video data. The video processing module 52 generates the left-eye video data and right-eye video data, taking into account a binocular parallax based on an eye separation distance or a viewing distance. The video processing module 52 requests the 2D/3D switch module 54 to set a video display area in the 3D display 15 in the 3D video display mode. To be more specific, the video processing module 52 outputs to the 2D/3D switch module 54 information (e.g. coordinates) indicative of the video display area and information indicating that the designated area (i.e. the video display area) is to be set in the 3D video display mode. The video display area is, for example, a window area for displaying video based on the video content data 61. Then, the video processing module 52 outputs the generated left-eye video data and right-eye video data to the video display module 53.

Besides, when it has been determined that video is displayed in the 3D video display mode and when 2D video data is included in the video content data 61, the video processing module 52 executes 2D to 3D conversion of the 2D video data. By the 2D to 3D conversion, a plurality of depths corresponding to a plurality of pixels included in each image frame of the 2D video are estimated, and a plurality of parallaxes corresponding to the estimated plural depths are calculated by taking into account a binocular parallax based on an eye separation distance or a viewing distance. In short, a plurality of parallaxes corresponding to a plurality of pixels included in the image frame are calculated. Based on the calculated parallaxes, the video processing module 52 generates left-eye video data and right-eye video data. The video processing module 52 requests the 2D/3D switch module 54 to set the video display area in the 3D display 15 in the 3D video display mode. Then, the video processing module 52 outputs the generated left-eye video data and right-eye video data to the video display module 53.

In addition, when it has been determined that video is displayed in the 2D video display mode and when 2D video data is included in the video content data 61, the video processing module 52 requests the 2D/3D switch module 54 to set the video display area in the 3D display 15 in the 2D video display mode. Then, the video processing module 52 outputs the 2D video data to the video display module 53.

The 2D/3D switch module 54 switches the video display mode of the video display area in accordance with the request by the video processing module 52. Specifically, the 2D/3D switch module 54 sets the designated area in the designated video display mode, based on the information which has been output by the video processing module 52. For example, when it has been requested by the video processing module 52 that the video display area be set in the 3D video display mode, and when the video display area is currently set in the 2D video display mode, the 2D/3D switch module 54 switches the display mode of the video display area from the 2D video display mode to the 3D video display mode. In addition, when it has been requested by the video processing module 52 that the video display area be set in the 2D video display mode, and when the video display area is currently set in the 3D video display mode, the 2D/3D switch module 54 switches the display mode of the video display area from the 3D video display mode to the 2D video display mode. In the 3D video display mode, that part of the lens unit 15B, which corresponds to the video display area, is controlled so as to have a lens function (refractive index) which is necessary for 3D video display. In the 2D video display mode, that part of the lens unit 15B, which corresponds to the video display area, is controlled so as to have a lens function which is necessary for 2D video display (i.e. so as to display 2D video as such, without being polarized).

The video display module 53 displays video on the video display area in the LCD 15A. Specifically, when left-eye video data and right-eye video data are being output by the video processing module 52, the video display module 53 displays left-eye video and right-eye video on the video display area in the LCD 15A by using the left-eye video data and right-eye video data. In addition, when 2D video data is being output by the video processing module 52, the video display module 53 displays 2D video on the video display area in the LCD 15A by using the 2D video data.

By the above-described structure for the video reproduction function, the user can view 3D video or 2D video, which is displayed on the 3D display 15 (video display area). In the meantime, when 3D video is displayed on the 3D display 15, the emission directions of pixels of the left-eye video and right-eye video, which is displayed on the video display area in the LCD 15A, are controlled by that part of the lens unit 15B, which corresponds to the video display area. Thereby, the user can stereoscopically perceive the video by the naked eyes.

Next, the structure for the message display control function is described.

The event detection module 55 detects an event at which a message is displayed. In other words, the event detection module 55 receives a request for displaying a message. The event is, for instance, an event for displaying a message by the video content reproduction program 13B (e.g. a message indicating an error or a status, a subtitle, a closed caption, etc.), or an event for displaying a control panel for operating the video content reproduction program 13B). To be more specific, for example, while video is being reproduced, if there is a problem with the video to be reproduced (e.g. an error of reading video content data 61 or an error of decoding video content data 61), an event occurs to notify the user of the error. In addition, for example, while video is being reproduced, if the user performs an operation for displaying a control panel (e.g. an operation panel for instructing start, pause or fast forward of video reproduction), an event occurs to display the control panel. Incidentally, the event may be not only an event which occurs in accordance with a process by the video content reproduction program 13B, but also an event which occurs in accordance with a process by the OS 13A or other various application programs. Thus, examples of the above-described event may include various events at which messages are displayed (notified) on the screen 15, such as the update of the OS 13A or various application programs, the reception of a new mail by a mailer program, and the connection of a removable device to the computer 1.

In accordance with the detected event, the event detection module 55 determines a message (message data) 62 that is to be displayed. The message data 62, as described above, include data for displaying a message indicating an error or a status, a subtitle, a closed caption, etc., or data for displaying a control panel, etc. The message data may include not only text data, but also image data such as a button, a menu or an icon. The event detection module 55 determines a message to be displayed, for example, by reading the message data 62 corresponding to the detected event from the storage device such as the HDD 21. In addition, the event detection module 55 determines a message to be displayed, for example, by detecting the message data 62 which has been read by the OS 13A or various application programs in accordance with the occurrence of the event. The event detection module 55 outputs the message data 62 to the message image generation module 56.

The message image generation module 56 generates a message image by using the message data 62 which has been output by the event detection module 55. The message image is, for example, a window (dialog) including the message which is notified to the user. In addition, the message image is, for example, a control panel for operating the video content reproduction program 13B. The message image generation module 56 outputs the generated message to the area select module 57.

The area select module 57 selects an area for displaying the message image, from one or more message display candidate areas which are indicated by candidate area information 63. The area select module 57 includes a candidate area calculation module 57A and a candidate area determination module 57B.

The candidate area calculation module 57A calculates a message display candidate area (hereinafter also referred to as "candidate area") corresponding to the coordinates (i.e. position and size) of the current video display area, by using the candidate area information 63 stored in the storage device such as the HDD 21.

FIG. 4 shows a structure example of the candidate area information 63. The candidate area information 63 includes one or more entries corresponding to one or more message display candidate areas. Each entry includes, for example, a priority and area information. In an entry corresponding to a certain message display candidate area, "Priority" indicates an order of preferential use of this candidate area. For example, a candidate area with a smaller value, which is set in the "Priority", is used with a higher priority. Then, for example, in the order from the smallest value that is set in the "Priority", it is determined whether a message is to be displayed on the associated candidate area. "Area information" indicates information for determining the coordinates of the associated candidate area. The "Area information" indicates, for example, a position relative to the video display area. Thus, the coordinates of the candidate area are calculated by using the information that is set in the "Area information" and the coordinates of the video display area.

In the "Area information" of each entry, for example, an area, which enables the user who is viewing video to easily visually recognize a message, is defined. A higher "Priority" is set for an entry of an area which is assumed to be more easily visually recognized. The area, which can be easily visually recognized by the user, is, for example, an area which hardly hinders viewing of video and which is close to the video display area.

Figure 6:
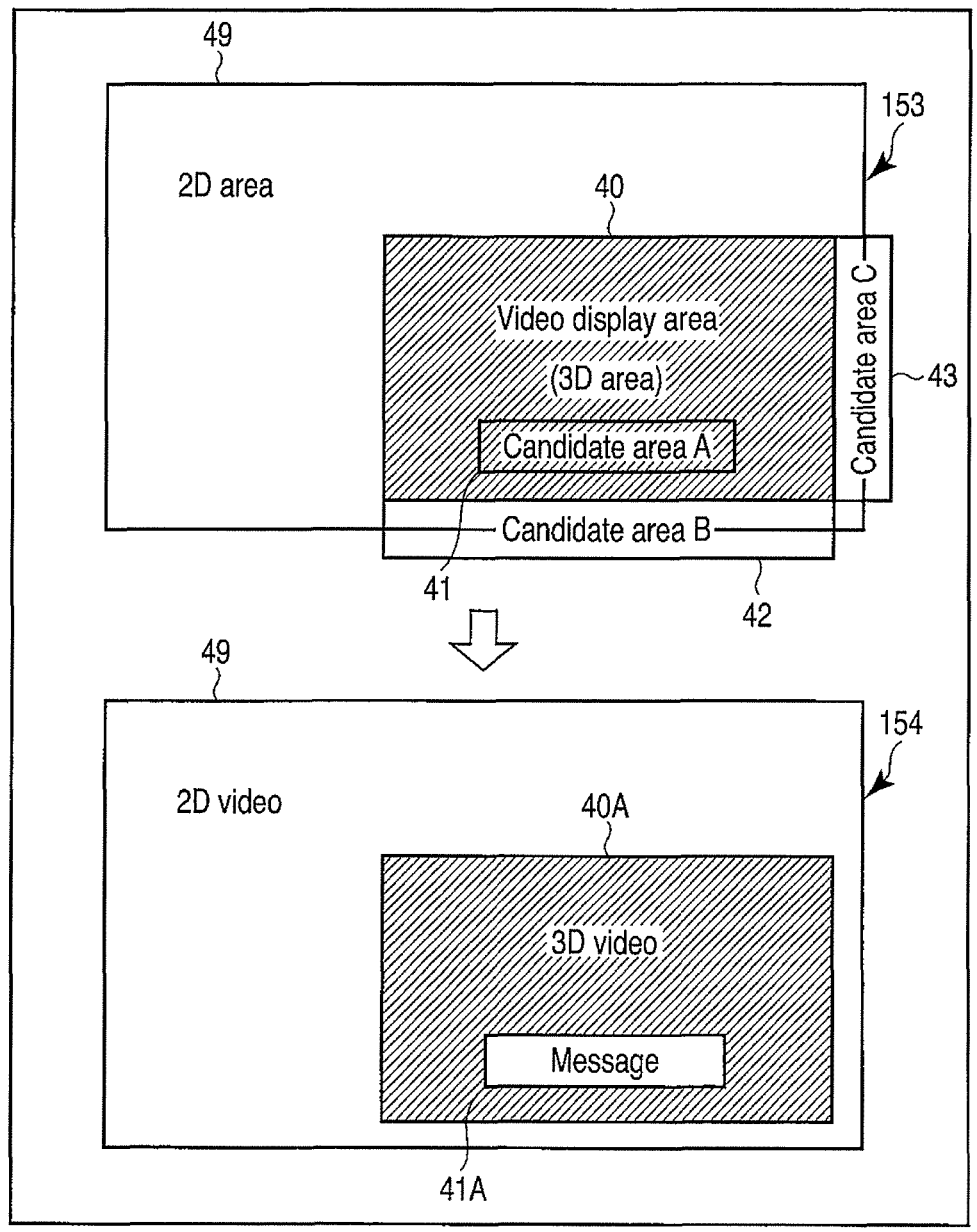
FIG. 6 shows another example of the message which is displayed by the electronic apparatus of the first embodiment.

For instance, in candidate area information 63A with "1" set in the "Priority" shown in FIG. 4, a candidate area A41 is provided in a lower part within a video display area 40, as in screen examples shown in FIGS. 5 and 6. The "Area information" of the candidate area information 63A indicates the ratios (%) of the width and height of the candidate area A41 to the width and height of the video display area 40, in a coordinate system which is defined such that an upper left vertex of the video display area 40 is the origin, the right side in the horizontal direction is positive, and the lower side in the vertical direction is positive. Accordingly, the candidate area A41 is an area extending from 40% to 60% of the width of the video display area 40, and extending from 75% to 85% of the height of the video display area 40.

In candidate area information 63B with "2" set in the "Priority", a candidate area B42 is provided on a lower side neighboring the video display area 40. The candidate area B42 has a height corresponding to 10% of the height of the screen 15. In candidate area information 63C with "3" set in the "Priority", a candidate area C43 is provided on a right side neighboring the video display area 40. The candidate area C43 has a width corresponding to 15% of the width of the screen 15. As regards the other candidate area information 63D, 63E, area candidates are similarly provided.

The candidate area calculation module 57A reads, according to the "Priority", one or more entries included in the candidate area information 63. Specifically, the candidate area calculation module 57A reads the entries one by one, in the order from the entry with the highest priority to the entries with lower priorities. Then, the candidate area calculation module 57A calculates the coordinates indicative of the candidate area on the display 15, based on the "Area information" indicated in the read entry and the coordinates of the video display area 40. The coordinates indicative of the candidate area include, for example, four coordinates (e.g. (500, 700), (600, 700), (600, 720), (500, 720)) which are indicative of the four vertices representing a rectangle. The candidate area calculation module 57A outputs the calculated coordinates indicative of the candidate area to the candidate area determination module 575.

Based on the coordinates indicative of the candidate area, which have been output by the candidate area calculation module 57A, and the display mode which is set for the candidate area, the candidate area determination module 57B determines whether a message image is to be displayed in the candidate area. For example, when a candidate area falls within the screen 15 and the candidate area is set in the 2D video display mode, the candidate area determination module 57B determines that this candidate area is used as a 2D video area (hereinafter also referred to as "message display area") for displaying the message image. In addition, when a candidate area falls within the screen 15, the candidate area is set in the 2D video display mode and a message image falls within the candidate area, the candidate area determination module 57B may determine that this candidate area is used as the message display area.

To be more specific, the candidate area determination module 57B determines whether the candidate area falls within the screen 15 or not. If the candidate area falls within the screen 15, the candidate area determination module 57B determines whether the candidate area is set in the 2D video display mode. If the candidate area is set in the 2D video display mode, the candidate area determination module 57B determines this candidate area to be the message display area. Then, the candidate area determination module 57B outputs to the message display module 58 the information (e.g. coordinates) indicative of the determined message display area and the message image.

If the candidate area does not fall within the screen 15, the candidate area determination module 57B requests the candidate area calculation module 57A to calculate the next candidate area (i.e. to calculate a candidate area having a subsequent priority).

Besides, if a candidate area falls within the screen 15 and the candidate area is set in the 3D video display mode, the candidate area determination module 57B determines whether provisional message display area information 64 is stored or not. This provisional message display area information 64 is stored, for example, in the main memory 13, and is initialized (reset) each time an event is detected by the event detection module 55 (i.e. each time a new message is displayed). If the provisional message display area information 64 is not stored, the candidate area determination module 57B stores (saves) information indicative of a candidate area as the provisional message display area information 64. Then, the candidate area determination module 57B requests the candidate area calculation module 57A to calculate the next candidate area. Thus, of all the candidate areas, a candidate area with the highest priority of the candidate areas, which fall within the screen 15 and are set in the 3D video display mode, is stored as the provisional message display area information 64. Even when all candidate areas, according to the saved provisional message display area information 64, meet at least one of the condition that the candidate area does not fall within the screen 15 and the condition that the candidate area is set in the 3D video display mode, the saved provisional message candidate area may be switched to the 2D video display mode and the candidate area may be used as the message display area. In short, by using the provisional message candidate area, the message display area in the 2D video display mode, which is used for displaying the message, is created.

In addition, when the candidate area calculation module 57A has been requested by the candidate area determination module 57B to calculate the next candidate area, the candidate area calculation module 57A refers to the candidate area information 63 and determines whether there is an unprocessed candidate area (i.e. an unprocessed entry). For example, when the candidate area calculation module 57A has completed the determination on the entry with "1" set in the "Priority", the candidate area calculation module 57A determines whether an entry with "2" set in the "Priority" is included in the candidate area information 63. When there is an unprocessed candidate area, the candidate area calculation module 57A calculates a candidate area and outputs the calculated candidate area to the candidate area determination module 57B. Then, as described above, the candidate area determination module 57B determines whether a message image is to be displayed in this candidate area. Specifically, as long as an unprocessed entry is included in the candidate area information 63, the process of calculating the candidate area by the candidate area calculation module 57A, and the process of determining, by the candidate area determination module 57B, whether the message is to be displayed in the calculated candidate area, are repeatedly executed until the message display area is determined.

On the other hand, when there is no unprocessed entry, the candidate area calculation module 57A notifies the candidate area determination module 57B that there is no other candidate area.

Responding to the notification by the candidate area calculation module 57A, the candidate area determination module 57B reads the information 64 indicative of the provisional message display area from the memory 13. The candidate area determination module 57B determines the provisional message display area 64 to be the message display area. Specifically, the candidate area, which falls within the screen 15 and is set in the 3D video display mode, is determined to be the message display area. Then, the candidate area determination module 57B requests the 2D/3D switch module 54 to set the determined message display area in the 2D video display mode. To be more specific, the candidate area determination module 57B outputs to the 2D/3D switch module 54 the information (e.g. coordinates) indicative of the message display area and the information indicating that the designated area (i.e. message display area) is to be set in the 2D video display mode. In addition, the candidate area determination module 57B outputs to the message display module 58 the information (e.g. coordinates) indicative of the determined message display area and the message image.

Responding to the request by the candidate area determination module 57B, the 2D/3D switch module 54 switches the video display mode of the message display area. Specifically, the 2D/3D switch module 54 sets the designated area in the designated display mode, based on the information which has been output by the candidate area determination module 57B. For example, when it is requested by the candidate area determination module 57B that the message display area be set in the 2D video display mode, the 2D/3D switch module 54 switches the display mode of the message display area from the 3D video display mode to the 2D video display mode. In addition, for example, when it is requested by the candidate area determination module 57B that the message display area be set in the 3D video display mode, the 2D/3D switch module 54 switches the display mode of the message display area from the 2D video display mode to the 3D video display mode.

The message display module 58 displays a message image on the message display area in the LCD 15, by using the information which has been output by the candidate area determination module 57B.

By the above-described structure for the message display control function, the user can visually recognize a message by 2D video, which is displayed on the 3D display 15 (message display area). The message is displayed in the message display area which is determined in accordance with the coordinates and display mode of the video display area 40, and is displayed, for example, in an area close to the video display area 40 on which 3D video is displayed, or in a partial area within the video display area 40. Thereby, the user can confirm the message at a position which hardly hinders the viewing of 3D video and is easy for visual recognition.

When the displayed message has disappeared (e.g. when the window of the message has been closed), the 2D/3D switch module 54 may restore the display mode of the message display area to the mode before the display of the message. For example, when the 3D video display mode has been switched to the 2D video display mode in order to display the message, the 2D/3D switch module 54 switches the display mode of the message display area from the 2D video display mode to the 3D video display mode.

Besides, the candidate area determination module 57B may determine the message display area, according to whether 2D video or 3D video is displayed on the video display area 40. For example, when 2D video is displayed on the video display area 40 (i.e. when the user is viewing 2D video), it is assumed that the entirety of the screen 15 is set in the 2D video display mode. Thus, when 2D video is displayed on the video display area 40, the candidate area determination module 57B can determine, without executing the above-described determination, the first candidate area (e.g. the candidate area with "1" set in the "Priority"), which has been calculated by the candidate area calculation module 57A, to be the message display area. Specifically, by determining whether 2D video or 3D video is displayed on the video display area 40, the candidate area determination module 57B may possibly omit the determination process and reduce the amount processing.

FIGS. 5 to 8 show examples of the screen on which a message is displayed.

In the examples of FIGS. 5 and 6, a video display area 40 is provided within the screen (3D display) 15. The video display area 40 is set in the 3D video display mode (i.e. 3D video is displayed on the video display area 40). An area 49 excluding the video display area 40 within the screen 15 is set in the 2D video display mode (i.e. 2D video is displayed on the area 49 excluding the video display area 40 within the screen 15).

In the example shown in FIG. 5, it is assumed that three message display candidate areas 41, 42 and 43 are provided, based on the coordinates of the video display area 40 and the candidate area information 63.

The candidate area determination module 57B first saves the candidate area A41 with a priority "1" as a provisional message display area 64 since the candidate area A41 falls within a screen 151 and is set in the 3D video display mode. Then, the candidate area determination module 57B determines the candidate area B42 with a priority "2" to be a message display area, since the candidate area B42 falls within the screen 151 and is set in the 2D video display mode. Thus, as shown in a screen 152, the video display module 53 displays 3D video (left-eye video and right-eye video) 40A in the video display area 40, and the message display module 58 displays a message 42A in the candidate area B42.

Also in the example shown in FIG. 6, it is assumed that three message display candidate areas 41, 42 and 43 are provided, based on the coordinates of the video display area 40 and the candidate area information 63.

The candidate area determination module 57B first saves the candidate area A41 with the priority "1" as a provisional message display area 64 since the candidate area A41 falls within a screen 153 and is set in the 3D video display mode. Then, the candidate area determination module 57B excludes the candidate area B42 with the priority "2" from candidates, since the candidate area B42 does not fall within the screen 153. Similarly, the candidate area determination module 57B excludes the candidate area C43 with a priority "3" from candidates, since the candidate area C43 does not fall within the screen 153. Subsequently, since the determination on all candidate areas has been completed, the candidate area determination module 573 determines the candidate area A41, which is saved as the provisional message display area 64, to be the message display area, and requests the 2D/3D switch module 54 to switch the display mode of the candidate area A41 to the 2D video display mode. Responding to this request, the 2D/3D switch module 54 switches the display mode of the candidate area A41 to the 2D video display mode. Thus, as shown in a screen 154, the video display module 53 displays 3D video (left-eye video and right-eye video) 40A in the video display area 40, and the message display module 58 displays a message 41A in the candidate area A41.

Figure 7:
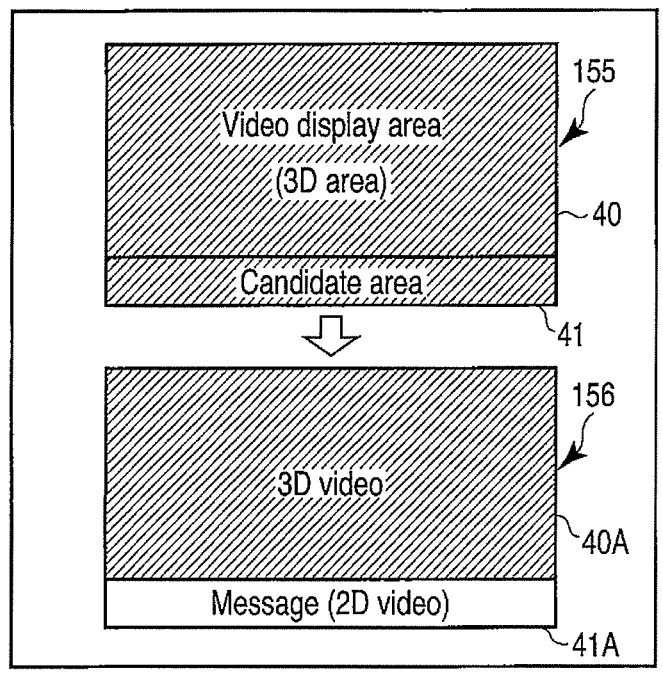
FIG. 7 shows still another example of the message which is displayed by the electronic apparatus of the first embodiment.
Figure 8:
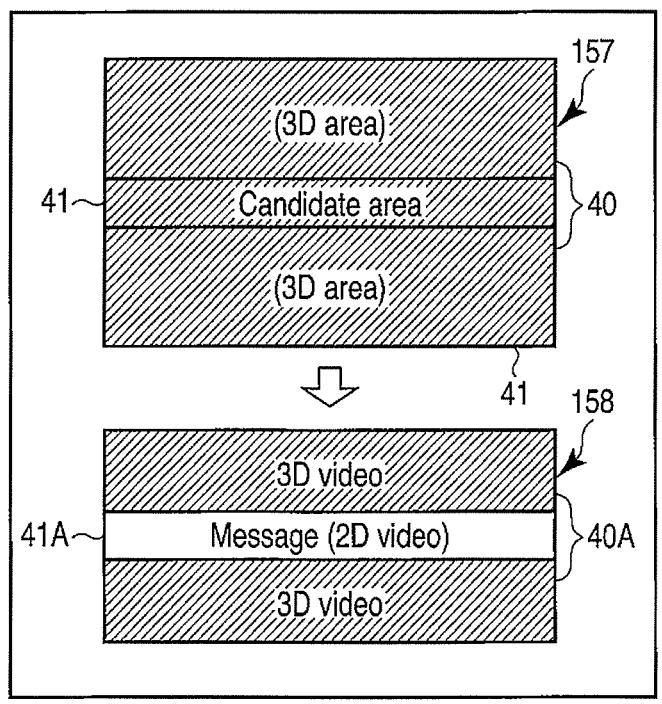
FIG. 8 shows still another example of the message which is displayed by the electronic apparatus of the first embodiment.

In the examples shown in FIGS. 7 and 8, the video display area 40 is provided on the entirety of the screen 15. This video display area 40 is set in the 3D video display mode.

In the example shown in FIG. 7, it is assumed that the message display candidate area 41, which is based on the coordinates of the video display area 40 and the candidate area information 63, is provided at a lower part of a screen 155.

The candidate area determination module 57B first saves the candidate area 41 with the priority "1" as the provisional message display area 64 since the candidate area 41 falls within the screen 155 and is set in the 3D video display mode. Then, since the determination on all candidate areas has been completed, the candidate area determination module 57B determines the candidate area 41, which is saved as the provisional message display area 64, to be the message display area, and requests the 2D/3D switch module 54 to switch the display mode of the candidate area 41 to the 2D video display mode. Responding to this request, the 2D/3D switch module 54 switches the display mode of the candidate area 41 to the 2D video display mode. Thus, as shown in a screen 156, the video display module 53 displays 3D video (left-eye video and right-eye video) 40A in the video display area 40, and the message display module 58 displays a message 41A in the candidate area (message display area) 41. In the meantime, responding to the narrowing of the video display area 40 due to the provision of the message display area 41, the video display module 53 may display 3D video by scaling down the 3D video or extracting a part of the 3D video.

In addition, like screens 157 and 158 shown in FIG. 8, the message display candidate area 41 may be provided at a position which divides the video display area 40, as well as a position at a lower end or an upper end of the screen 157. As shown in the screen 158, the video display module 53 displays 3D video (left-eye video and right-eye video) 40A in the video display area 40, and the message display module 58 displays a message 41A in the candidate area (message display area) 41. Incidentally, responding to the division of the video display area 40 by the message display area 41, the video display module 53 may display 3D video by extracting a part of the 3D video.

Figure 9:
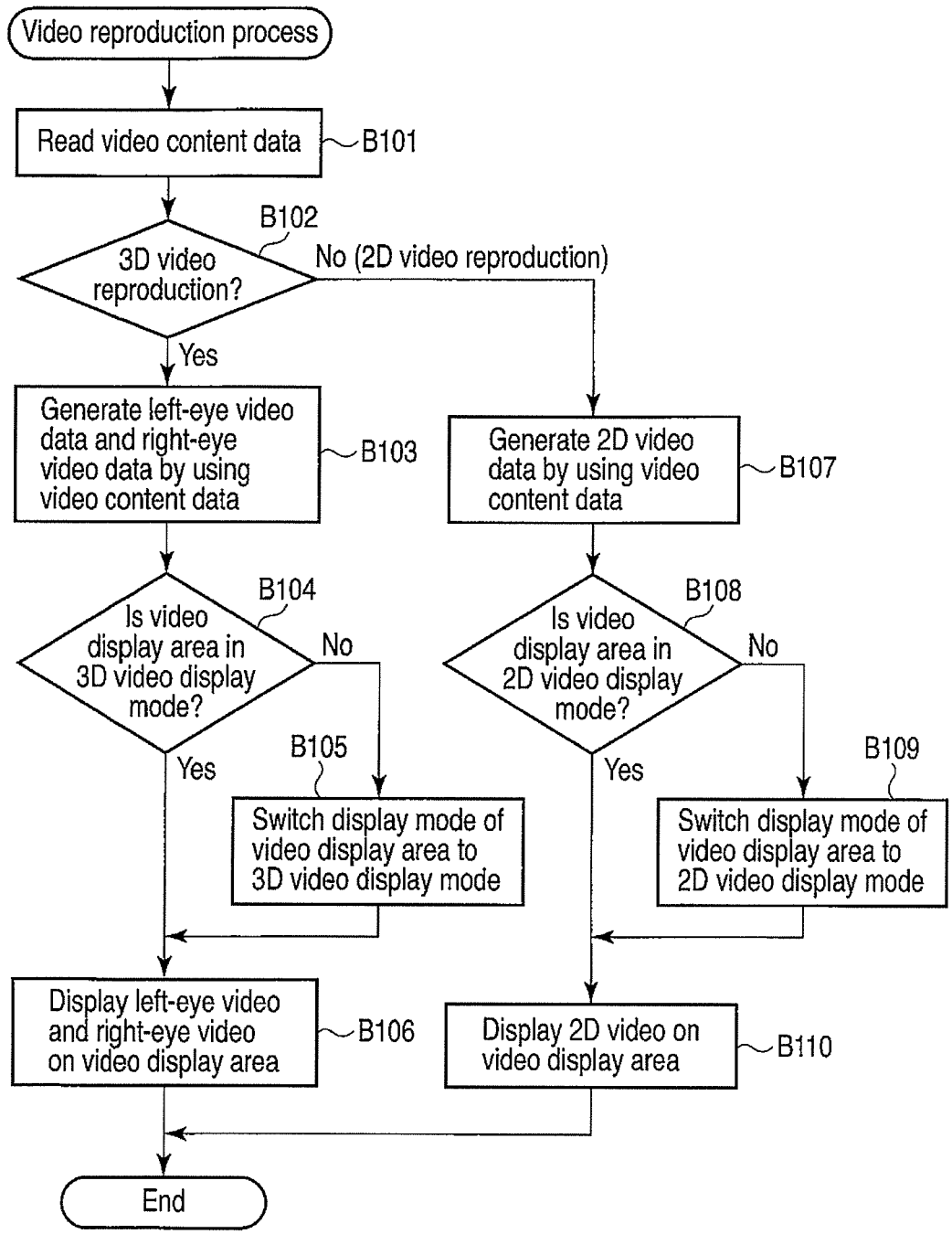
FIG. 9 is a flowchart illustrating an example of the procedure of a video reproduction process which is executed by the electronic apparatus of the first embodiment.

Next, referring to a flowchart of FIG. 9, an example of the procedure of the video reproduction process is described. The video content reproduction program 13B displays 3D video or 2D video on the video display area 40 by using the video content data 61.

To start with, the video read module 51 reads the video content data 61 from the storage device such as the HDD 21 (block B101). The video content data 61 includes 2D video data or 3D video data. The video read module 51 outputs the read video content data 61 to the video processing module 52.

Then, the video processing module 52 determines whether the video content data 61, which has been output by the video read module 51, is reproduced as 3D video or not (block 8102). For example, when the video content data 61 includes 3D video data, the video processing module 52 determines that the video content data 61 is reproduced as 3D video. In addition, for example, when it is instructed by the user that the video content data 61 is to be reproduced as 3D video, the video processing module 52 determines that the video content data 61 is reproduced as 3D video.

If it has been determined that the video content data 61 is reproduced as 3D video (YES in block B102), the video processing module 52 generates left-eye video data and right-eye video data by using the video content data 61 (block B103). Specifically, when the video content data 61 includes 3D video data, the video processing module 52 generates left-eye video data and right-eye video data by using the 3D video data. In addition, when the video content data 61 includes 2D video data, the video processing module 52 generates left-eye video data and right-eye video data by 2D to 3D converting the 2D video data.

Then, the 2D/3D switch module 54 determines whether the video display area 40, on which the left-eye video data and right-eye video data are displayed, is set in the 3D video display mode (block B104). If the video display area 40 is set in the 3D video display mode (YES in block B104), the video display module 53 displays left-eye video and right-eye video on the video display area 40 by using the left-eye video data and right-eye video data (block B106).

In addition, if the video display area 40 is not set in the 3D video display mode (NO in block B104), that is, when the video display area 40 is set in the 2D video display mode, the 2D/3D switch module 54 switches the display mode of the video display area 40 (that part of the lens unit 15B, which corresponds to the video display area 40) from the 2D video display mode to the 3D video display mode (block B105). Then, the video display module 53 displays left-eye video and right-eye video on the video display area 40 by using the left-eye video data and right-eye video data (block B106).

On the other hand, if it has been determined that the video content data 61 is not reproduced as 3D video (NO in block B102), that is, when it has been determined that the video content data 61 is reproduced as 2D video, the video processing module 52 generates 2D video data by using the video content data 61 (block B107). Then, the 2D/3D switch module 54 determines whether the video display area 40 is set in the 2D video display mode (block B108). If the video display area 40 is set in the 2D video display mode (YES in block B108), the video display module 53 displays 2D video on the video display area 40 by using the 2D video data (block B110).

Meanwhile, if the video display area 40 is not set in the 2D video display mode (NO in block B108), that is, when the video display area 40 is set in the 3D video display mode, the 2D/3D switch module 54 switches the display mode of the video display area 40 from the 3D video display mode to the 2D video display mode (block B109). Then, the video display module 53 displays 2D video on the video display area 40 by using the 2D video data (block B110).

By the above-described process, 2D video or 3D video is displayed on the video display area 40 by using the video content data 61. The video content data 61 is successively reproduced on a frame-by-frame basis. Then, when various messages are to be displayed on the screen while the 2D video or 3D video is being displayed on the video display area 40, the display of such messages is controlled.

FIG. 10 is a flowchart illustrating an example of the procedure of the message display control process.

To start with, the event detection module 55 determines whether an event for displaying a message has been detected (block B201). When an event for displaying a message has been detected (YES in block B201), it is determined whether there is an unprocessed message display candidate area among one or more message display candidate areas which are indicated in the candidate area information 63 (block B202). The one or more message display candidate areas, which are indicated in the candidate area information 63, are processed in the order of the priority of the candidate areas included in the candidate area information 63. Specifically, the candidate areas are set to be targets of processing in the order from the candidate area with the highest priority. Accordingly, for example, the candidate area, which is first processed as an unprocessed candidate area, is the candidate area with the priority "1".

When there is an unprocessed candidate area (YES in block B202), the candidate area calculation module 57A calculates coordinates indicating this unprocessed candidate area, based on the coordinates of the video display area 40 and the candidate area information 63 (block B203). Then, the candidate area determination module 57B determines whether the calculated coordinates indicating the candidate area fall within the screen 15 (block B204). If the calculated coordinates indicating the candidate area do not fall within the screen (NO in block B204), the process returns to block B202 and another unprocessed candidate area is processed.

On the other hand, if the calculated coordinates indicating the candidate area fall within the screen (YES in block B204), the candidate area determination module 57B determines whether a provisional message display area 64 is unregistered or not (block B205). When the provisional message display area 64 is unregistered (YES in block B205), the candidate area determination module 57B registers the calculated candidate area as the provisional message display area 64 (block B206), and advances to block B207. If the provisional message display area 64 is not unregistered (NO in block B205), the process advances to block B207. For example, the candidate area with the highest priority, among the candidate areas with coordinates falling within the screen 15, is set as the provisional message display area 64.

Then, it is determined whether the candidate area, which has been calculated in block B203, is set in the 2D video display mode (block B207). If the calculated candidate area is set in the 2D video display mode (YES in block B207), the candidate area determination module 57B determines this candidate area to be the message display area (block B208). Then, the message display module 58 displays the message on the message display area (block B209). On the other hand, if the calculated candidate area is not set in the 2D video display mode (NO in block B207), the process returns to block B202 and another unprocessed candidate area is processed.

Meanwhile, when there is no unprocessed message display candidate area (NO in block B202), the candidate area determination module 57B determines the provisional message display area 64 to be the message display area (block B210). Then, the 2D/3D switch module 54 switches the display mode of the provisional message display area from the 3D video display mode to the 2D video display mode (block B211). In the meantime, the 2D/3D switch module 54 may switch the display mode of only that area (e.g. an area of a size corresponding to the message, or an area which is obtained by adding a predetermined margin to the area of a size corresponding to the message) of the message display area, which is necessary for displaying the message, to the 2D video display mode. Then, the message display module 58 displays the message on the determined message display area (block B212). Subsequently, when the message disappeared, the 2D/3D switch module 54 switches the display mode of the message display area from the 2D video display mode to the 3D video display mode (block B213). Thereby, the display mode of the message display area is restored to the original 3D video display mode.

By the above-described process, the video content reproduction program 13B can control the display of the message by 2D video, which is presented to the user. The message is displayed on the message display area which is determined in accordance with the position and size of the video display area 40 and the display mode. For example, the message is displayed in an area close to the video display area 40 on which 3D video is displayed, or in a partial area of the video display area 40. Thereby, the user can confirm the message at a position, which hardly hinders viewing of video and is easy for visual recognition.

FIG. 11 is a block diagram illustrating an example of the functional configuration of a video content reproduction program 13C which is executed by an electronic apparatus according to a second embodiment. The electronic apparatus of the second embodiment has the same structure as the electronic apparatus 1 which has been described with reference to FIGS. 1 and 2 in connection with the first embodiment. Specifically, the CPU 11 of the electronic apparatus 1 executes the video content reproduction program 13C which is loaded from the HDD 21 into the main memory 13. In addition, the 3D display 15 of the electronic apparatus 1 is configured to be able to set each of a plurality of areas with arbitrary positions and sizes, which are set in the screen, in either a 3D video display mode or a 2D video display mode.

The video content reproduction program 13C has a video reproduction function for reproducing video content data 81 as 3D video or 2D video. In addition, the video content reproduction program 13C has a menu display control function for displaying various menus, which are displayed during a period in which video is being reproduced, so that the user may easily visually recognize the menus.

The video content reproduction program 13C includes a video read module 71, a video processing module 72, a video display module 73, a 2D/3D switch module 74, an event detection module 75, a menu image generation module 76, an area select module 77, and a menu display module 78. The video read module 71, video processing module 72, video display module 73 and 2D/3D switch module 74 realize the video reproduction function. The event detection module 75, menu image generation module 76, area select module 77, menu display module 78, and 2D/3D switch module 74 realize the menu display control function. The structure for the video reproduction function and the structure for the menu display control function will be described below.

To begin with, the structure for the video reproduction function is described. For example, as shown in FIG. 12, video is displayed on a video display area 91A which is provided in a window 161. The window 161 is a predetermined rectangular area which is displayed on the screen (display) 15. The window 161 may be displayed on the entirety of the screen (full-screen display).

The video read module 71 reads the video content data 81 from, for example, storage media such as a DVD, or from a storage device such as the HDD 21. Meanwhile, the video read module 71 may receive the video content data 81 via the TV tuner 30 or LAN controller 20, 23. The video content data 81 includes 2D video data for displaying 2D video, or 3D video data for displaying 3D video. Such video data is, for example, compression-encoded video data (e.g. MPEG). In this case, the video data is decoded and then used. In addition, the video content data 81 may include various metadata. The video read module 71 outputs the read (received) video content data 81 to the video processing module 72.

The video processing module 72 generates video data by using the video content data 81 which has been output by the video read module 71. Specifically, the video processing module 72 first determines whether video is to be displayed in either the 2D video display mode or the 3D video display mode. For example, if 3D video data is included in the video content data 81, the video processing module 72 determines that video is to be displayed in the 3D video display mode. In addition, the video processing module 72 determines that video is to be displayed in a display mode which is designated by the user. The user selects the video display mode, for example, by using an operation screen including buttons for selecting either the 2D video display mode or the 3D video display mode.

When it has been determined that video is displayed in the 3D video display mode and when 3D video data is included in the video content data 81, the video processing module 72 generates left-eye video data and right-eye video data by using the 3D video data. The video processing module 72 generates the left-eye video data and right-eye video data, taking into account a binocular parallax based on an eye separation distance or a viewing distance. The video processing module 72 requests the 2D/3D switch module 74 to set a video display area 91A in the 3D display 15 in the 3D video display mode. To be more specific, the video processing module 72 outputs to the 2D/3D switch module 74 information (e.g. coordinates) indicative of the video display area 91A and information indicating that the designated area (i.e. the video display area 91A) is to be set in the 3D video display mode. The video display area 91A is, for example, an area in a window for displaying video based on the video content data 81. Then, the video processing module 72 outputs the generated left-eye video data and right-eye video data to the video display module 73.

Besides, when it has been determined that video is displayed in the 3D video display mode and when 2D video data is included in the video content data 81, the video processing module 72 executes 2D to 3D conversion of the 2D video data. By the 2D to 3D conversion, a plurality of depths corresponding to a plurality of pixels included in each image frame of the 2D video are estimated, and a plurality of parallaxes corresponding to the estimated plural depths are calculated by taking into account a binocular parallax based on an eye separation distance or a viewing distance. In short, a plurality of parallaxes corresponding to a plurality of pixels included in the image frame are calculated. Based on the calculated parallaxes, the video processing module 72 generates left-eye video data and right-eye video data. The video processing module 72 requests the 2D/3D switch module 74 to set the video display area 91A in the 3D display 15 in the 3D video display mode. Then, the video processing module 72 outputs the generated left-eye video data and right-eye video data to the video display module 73.

In addition, when it has been determined that video is displayed in the 2D video display mode and when 2D video data is included in the video content data 81, the video processing module 72 requests the 2D/3D switch module 74 to set the video display area 91A in the 3D display 15 in the 2D video display mode. Then, the video processing module 72 outputs the 2D video data to the video display module 73.

The 2D/3D switch module 74 switches the video display mode of the video display area 91A in accordance with the request by the video processing module 72. Specifically, the 2D/3D switch module 74 sets the designated area in the designated video display mode, based on the information which has been output by the video processing module 72. For example, when it has been requested by the video processing module 72 that the video display area 91A be set in the 3D video display mode, and when the video display area is currently set in the 2D video display mode, the 2D/3D switch module 74 switches the display mode of the video display area 91A from the 2D video display mode to the 3D video display mode. In addition, when it has been requested by the video processing module 72 that the video display area 91A be set in the 2D video display mode, and when the video display area 91A is currently set in the 3D video display mode, the 2D/3D switch module 74 switches the display mode of the video display area 91A from the 3D video display mode to the 2D video display mode. In the 3D video display mode, that part of the lens unit 15B, which corresponds to the video display area 91A, is controlled so as to have a lens function (refractive index) which is necessary for 3D video display. In the 2D video display mode, that part of the lens unit 15B, which corresponds to the video display area 91A, is controlled so as to have a lens function which is necessary for 2D video display (i.e. so as to display 2D video as such, without being polarized).

The video display module 73 displays video on the video display area 91A in the LCD 15A. Specifically, when left-eye video data and right-eye video data are being output by the video processing module 72, the video display module 73 displays left-eye video and right-eye video on the video display area 91A in the LCD 15A by using the left-eye video data and right-eye video data. In addition, when 2D video data is being output by the video processing module 72, the video display module 73 displays 2D video on the video display area 91A in the LCD 15A by using the 2D video data.

By the above-described structure for the video reproduction function, the user can view 3D video or 2D video, which is displayed on the 3D display 15 (video display area 91A). In the meantime, when 3D video is displayed on the 3D display 15, the emission directions of pixels of the left-eye video and right-eye video, which is displayed on the video display area 91A in the LCD 15A, are controlled by that part of the lens unit 15B, which corresponds to the video display area 91A. Thereby, the user can stereoscopically perceive the video by the naked eyes.

Next, the structure for the menu display control function is described. In the description below, for the purpose of easier description, it is assumed that 3D video is displayed on the video display area 91A in the window 161. It is also assumed that a menu, which is displayed by the menu display function, is 2D video.

The event detection module 75 detects an event for displaying various menus, based on user operation information 82 indicative of an operation by the user. In other words, the event detection module 75 receives a request for displaying a menu. The user operation information 82 is output, for example, by the OS 13A.

The event is, for instance, an event which displays a menu for operating the video content reproduction program 13C. To be more specific, for example, when the user has executed an operation for displaying a control menu while video is being displayed, an event for displaying the control menu occurs. The operation for displaying the control menu is, for example, a mouse-over operation within a predetermined area. For example, as shown in FIG. 12, the window 161 is provided with a mouse-over detection area 91F where a mouse-over operation is detected. In the mouse-over detection area 91F, an event occurs when it has been detected that a cursor (mouse cursor) indicative of a position instructed by using, e.g. a mouse, touch pad 27 or a touch panel has entered this area 91F. In addition, for example, as shown in FIG. 13, a control menu 91C is displayed at a lower part neighboring the video display area 91A. The control menu 91C includes various buttons for controlling reproduction of video, and a display area displaying the state of reproduction (e.g. a position of play, a volume, etc.). By using the buttons on the control menu 91C, the user can instruct the start of reproduction of video, stop, pause, fast forward, fast rewind, skip, replay, slow-motion play, etc.

Figure 14:
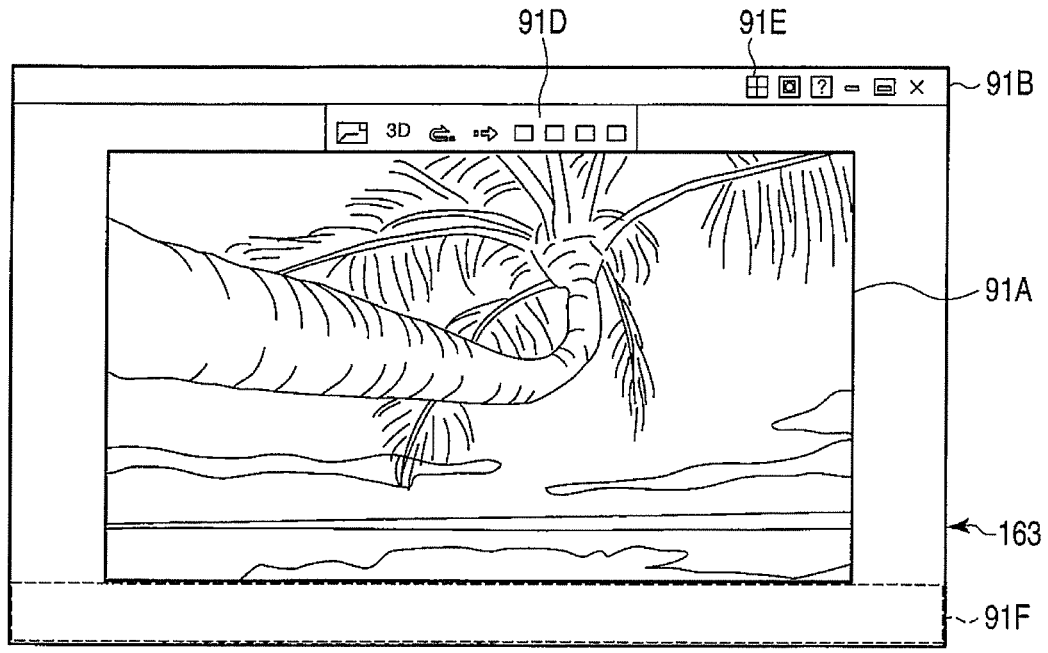
FIG. 14 shows a third example of the screen which is displayed by the electronic apparatus of the second embodiment.

In addition, for example, when the user has executed an operation for displaying a top menu while video is being reproduced, an event for displaying the top menu occurs. The operation for displaying the top menu is, for example, an operation of pressing a predetermined button. As shown in FIG. 14, for example, a top menu 91D is displayed at an upper part neighboring the video display area 91A. The top menu includes various buttons for controlling the reproduction mode of video. By using the buttons on the top menu 91D, the user can instruct, for example, switching of 2D video reproduction/3D video reproduction, repeat playback, etc.

Furthermore, for example, when the user has executed an operation for starting the video content reproduction program 13C, an event for displaying a title bar occurs. For example, as shown in FIG. 12, a title bar 91b is displayed at an uppermost part of the window 161. The title bar 91B includes text indicative of the title of the application, and various buttons for operating the window 161. The title bar 91B is provided with, for example, a button for closing the window, a button for maximizing the window, a button for minimizing the window, a button for displaying a setup screen, a button for displaying a help menu, and a button (top menu display button) 91E for displaying the top menu in the window 161.

The event detection module 75 determines a menu (menu data) 83 which is to be displayed, in accordance with the detected event. The menu data 83 includes data for displaying various menus, such as the above-described control menu 91C, top menu 91D and title bar 91B. The menu data 83 may include not only text data, but also image data such as a button, an icon, a slider, or a list. The event detection module 75 determines a menu that is to be displayed, for example, by reading the menu data 83 corresponding to the detected event from the storage device such as the HDD 21. In addition, the event detection module 75 determines a menu to be displayed, for example, by detecting the menu data 83 which has been read by the OS 13A or various application programs in accordance with the occurrence of the event. The event detection module 75 outputs the menu data 83 to the menu image generation module 76.

In the meantime, the event detection module 75 may detect an event for hiding a displayed menu. This event is, for example, an event which occurs due to the passing of a predetermined period (e.g. five seconds) without operation after the display of a menu, an event which occurs due to the pressing of a button for hiding a menu after the display of the menu, or an event which occurs due to clicking of a predetermined area after the display of a menu. By the detection of such an event, a displayed menu is hidden.

The menu image generation module 76 generates a menu image by using the menu data 83 which has been output by the event detection module 75. The menu image is, for example, a control panel (e.g. control menu 91C, top menu 91D or title bar 91B) for operating the video content reproduction program 13C. The menu image generation module 76 outputs the generated menu image to the area select module 77.

The area select module 77 selects an area for displaying the menu image, from one or more menu display candidate areas which are indicated by candidate area information 84. The area select module 77 includes a candidate area calculation module 77A and a candidate area determination module 77B.

The candidate area calculation module 77A calculates a menu display candidate area (hereinafter also referred to as "candidate area") corresponding to the coordinates (i.e. position and size) of the current video display area, by using the candidate area information 84 stored in the storage device such as the HDD 21.

The candidate area calculation module 77A selects an entry corresponding to the kind of menu from one or more entries included in the candidate area information 84 and reads this entry. For example, the candidate area information 84 includes a plurality of entries corresponding to the control menu 91C, top menu 91D and title bar 91B. Each entry includes, for example, a menu name and area information. In an entry corresponding to a certain menu, the "Menu name" indicates the name of the menu (e.g. "Control menu") for which the associated candidate area is to be used. The "Area information" indicates information for determining the coordinates of the associated candidate area. The "Area information" indicates, for example, a position relative to the video display area 91A. Thus, the coordinates of the candidate area are calculated by using the information that is set in the "Area information" and the coordinates of the video display area 91A.

The candidate area calculation module 77A calculates the coordinates indicative of the candidate area on the display 15, based on the "Area information" indicated in the read entry and the coordinates of the video display area (3D video display area) 91A. The coordinates indicative of the candidate area include, for example, four coordinates (e.g. (500, 700), (600, 700), (600, 720), (500, 720)) which are indicative of the four vertices representing a rectangle. The candidate area calculation module 77A outputs the calculated coordinates indicative of the candidate area to the candidate area determination module 77B.

Based on the coordinates indicative of the candidate area, which have been output by the candidate area calculation module 77A, and the display mode which is set for the candidate area, the candidate area determination module 77B determines whether a menu image is to be displayed in the candidate area. If a candidate area falls within the screen 15 and the candidate area is set in the 2D video display mode, the candidate area determination module 77B determines that this candidate area is used as a 2D video area (hereinafter also referred to as "menu display area") for displaying the menu image. For example, as shown in FIG. 12, it is assumed that the candidate area calculation module 77A has calculated an area 91B neighboring an upper part of the video display area 91A in the window 161, in order to display the title bar. When this area 91B (candidate area) falls within the screen 15 and the candidate area is set in the 2D video display mode, the candidate area determination module 77B determines the area 91B to be the area for displaying the title bar. Then, the candidate area determination module 77B outputs to the menu display module 78 the information (e.g. coordinates) indicative of the determined menu display area and the menu image.

Besides, if a candidate area falls within the screen 15 and the candidate area is set in the 3D video display mode, the candidate area determination module 77B determines that this candidate area is used as the area (hereinafter also referred to as "menu display area") for displaying the menu image. For example, as shown in FIG. 13, it is assumed that the candidate area calculation module 77A has calculated an area 91C at a lower part within the window 161, in order to display the control menu. When this area 91C (candidate area) falls within the screen 15 and the candidate area is set in the 3D video display mode, the candidate area determination module 77B determines the area 91C to be the area for displaying the control menu. Then, the candidate area determination module 77B outputs to the menu display module 78 the information (e.g. coordinates) indicative of the determined menu display area and the menu image. In addition, the candidate area determination module 77B requests the 2D/3D switch module 74 to set the determined menu display area in the 2D video display mode. To be more specific, the candidate area determination module 77B outputs to the 2D/3D switch module 74 the information (e.g. coordinates) indicative of the menu display area and the information indicating that the designated area (i.e. menu display area) is to be set in the 2D video display mode.

In addition, based on the calculated menu display area, the candidate area determination module 77B alters the video display area 91A. Specifically, when the menu display area is set such that the menu display area overlaps a part of the video display area 91A, the candidate area determination module 77B newly sets a video display area 91A, based on the overlap area. For example, the candidate area determination module 77B sets, as a new video display area 91A, an area which is obtained by excluding the overlap area from the original video display area 91A. At this time, the video display area 91A may be set by reducing the video display area 91A in size while keeping the aspect ratio unchanged. For example, when the control menu display area 91C, which is shown in a window 162 of FIG. 13, is further displayed while the window 161 of FIG. 12 is displayed, the video display area 91A in the window 161 overlaps the control menu display area 91C in the window 162. Thus, like the video display area 91A shown in FIG. 13, the candidate area determination module 77B sets the video display area 91A by reducing the video display area 91A to the area from which the overlap area of the video display area 91A is excluded. Then, the candidate area determination module 77B outputs the information (e.g. coordinates) indicative of the altered video display area 91A to the video display module 73. In addition, the candidate area determination module 77B requests the 2D/3D switch module 74 to set the altered video display area 91A in the 3D video display mode. To be more specific, the candidate area determination module 778 outputs to the 2D/3D switch module 74 the information (e.g. coordinates) indicative of the video display area 91A and the information indicating that the designated area (i.e. video display area) is to be set in the 3D video display mode.

Responding to the request by the candidate area determination module 77B, the 2D/3D switch module 74 switches the video display mode of the menu display area. Specifically, the 2D/3D switch module 74 sets the designated area in the designated display mode, based on the information which has been output by the candidate area determination module 77B. For example, when it is requested by the candidate area determination module 77B that the menu display area be set in the 2D video display mode, the 2D/3D switch module 74 sets the display mode of the menu display area in the 2D video display mode.

In addition, responding to the request by the candidate area determination module 77B, the 2D/3D switch module 74 sets the video display mode of the altered video display area 91A. Specifically, the 2D/3D switch module 74 sets the designated area in the designated display mode, based on the information which has been output by the candidate area determination module 77B. For example, when it is requested by the candidate area determination module 77B that the altered video display area 91A be set in the 3D video display mode, the 2D/3D switch module 74 sets the altered video display area 91A in the 3D video display mode.

The menu display module 78 displays a menu image on the menu display area in the LCD 15, by using the information which has been output by the candidate area determination module 77B. For example, the menu display module 78 displays the control menu on the control menu display area 91C.

In addition, the video display module 73 displays video (left-eye video and right-eye video) on the altered video display area 91A, by using the information of the altered video display area 91A which has been output by the candidate area determination module 77B, and the left-eye video data and right-eye video data which have been output by the video processing module 72. The video display module 73 displays the video, for example, by trimming the video in accordance with the altered video display area 91A. The video display module 73 may display the video, for example, by scaling (reducing) the video in accordance with the altered video display area 91A. Besides, after the video display module 73 has displayed the video on the altered video display area 91A, the menu display module 78 may write the menu image over the video, so that the 2D menu image is imposed on the 3D video.

By the above-described structure for the menu display control function, the user can visually recognize a menu by 2D video, which is displayed on the 3D display 15 (menu display area). The menu is displayed in the menu display area which is determined in accordance with the coordinates and display mode of the video display area 91A, and is displayed, for example, in an area close to the video display area 91A on which 3D video is displayed. Thereby, the user can confirm the menu at a position which hardly hinders the viewing of 3D video and is easy for visual recognition.

Next, referring to FIGS. 12 to 18, examples of the window on which a menu is displayed are described.

FIG. 12 shows an example of a window 161 including 3D video.

The window 161 includes a 3D video display area 91A and a title bar display area 91B. 3D video is displayed on the 3D video display area 91A. 2D video including various buttons for operating the window 161 is displayed on the title bar display area 91B. The title bar display area 91B is provided with, for example, a top menu display button 91E for displaying a top menu in the window 161. When the top menu display button 91E has been pressed, the top menu is further displayed in the window 161. In addition, the window 161 is provided with a mouse-over detection area 91F in which a mouse-over operation is detected. When a mouse-over operation in the mouse-over detection area 91F has been detected, a control menu is further displayed in the window 161.

FIG. 13 shows an example of a window 162 including 3D video and a control menu.

The window 162 includes a 3D video display area 91A, a title bar display area 91B and a control menu display area 91C. The control menu display area 91C displays a control menu (2D video) including various buttons for controlling reproduction of 3D video, and a display area indicating the state of reproduction (e.g. a position of reproduction, a volume, etc.). By using the buttons on the control menu, the user can instruct the start of reproduction of video, stop, pause, fast forward, fast rewind, skip, replay, etc.

The window 162 is displayed, for example, when a mouse-over operation in the mouse-over detection area 91F has been detected during a period in which the window 161 shown in FIG. 12 is being displayed. In the window 162, since the control menu display area 91C is provided, the 3D video display area 91A is reduced in size while the aspect ratio is being kept unchanged. Specifically, when the original 3D video display area 91A (i.e. the 3D video display area 91A in the window 161) and the control menu display area 91C overlap, an area, which is obtained by excluding the overlapping area from the original 3D video display area 91A, is set as a new 3D video display area 91A.

FIG. 14 shows an example of a window 163 including 3D video and a top menu.

The window 163 includes a 3D video display area 91A, a title bar display area 91B and a top menu display area 91D. In the top menu display area 91D, a top menu (2D video) including various buttons for controlling the reproduction mode of video is displayed. The user can instruct, for example, switching of 2D video reproduction/3D video reproduction, repeat playback, etc., by using the buttons on the top menu.

The window 163 is displayed, for example, when the top menu display button 91E has been pressed on the window 161 shown in FIG. 12 (i.e. when the button 91E has been pressed during a period in which the top menu is not displayed). In the window 163, since the top menu display area 91D is provided, the 3D video display area 91A is reduced in size while the aspect ratio is being kept unchanged. Specifically, when the original 3D video display area 91A and the top menu display area 91D overlap, an area, which is obtained by excluding the overlapping area from the original 3D video display area 91A, is set as a new 3D video display area 91A.

Figure 15:
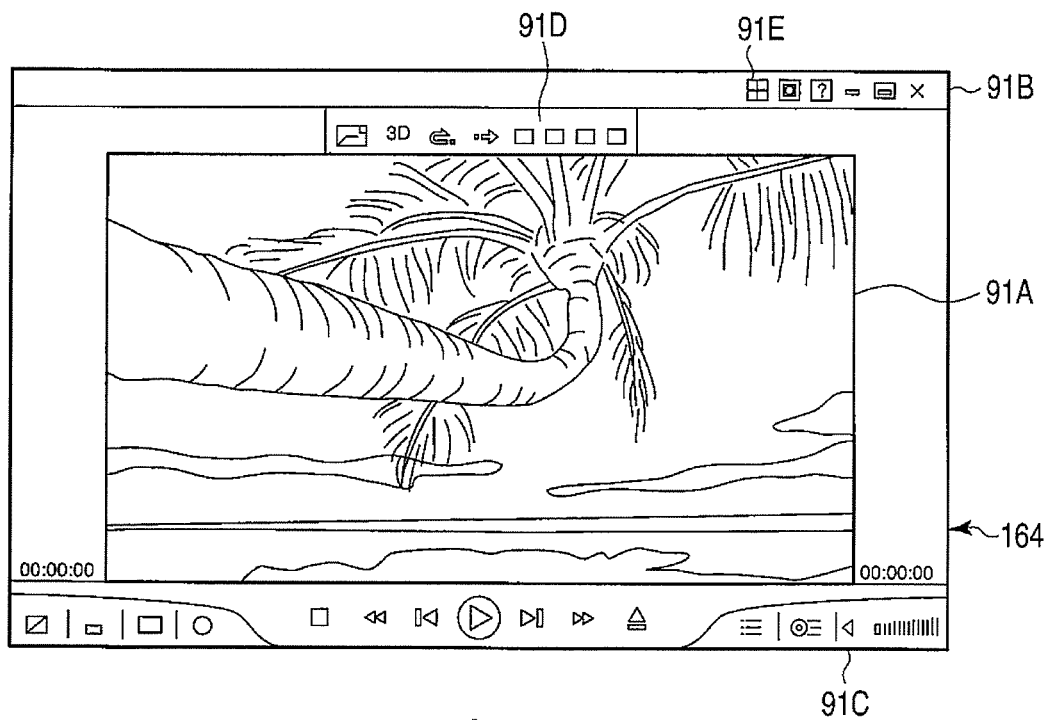
FIG. 15 shows a fourth example of the screen which is displayed by the electronic apparatus of the second embodiment.

FIG. 15 shows an example of a window 164 including 3D video, a control menu and a top menu.

The window 164 includes a 3D video display area 91A, a title bar display area 91B, a top menu display area 91D, and a control menu display area 91C. The window 164 is displayed, for example, when the top menu display button 91E has been pressed on the window 162 shown in FIG. 13. In addition, the window 164 is displayed, for example, when a mouse-over operation in the mouse-over detection area 91F has been detected on the window 163 shown in FIG. 14. In the window 164, since the control menu display area 91C and the top menu display area 91D are provided, the 3D video display area 91A is reduced in size while the aspect ratio is being kept unchanged. Specifically, when the original 3D video display area 91A, the control menu display area 91C and the top menu display area 91D overlap, an area, which is obtained by excluding the overlapping area from the original 3D video display area 91A, is set as a new 3D video display area 91A.

FIG. 16 shows a window 165 which is another example of the window including 3D video and a control menu.

The window 165 includes a 3D video display area 91A, a title bar display area 91B and a control menu display area 91C. The window 165 is displayed, for example, when a mouse-over operation in the mouse-over detection area 91F has been detected during a period in which the window 161 shown in FIG. 12 is being displayed. In the window 165, since the control menu display area 91C is provided, the 3D video display area 91A is narrowed (trimmed) by an area corresponding to the control menu display area 91C. Specifically, when the original 3D video display area 91A and the control menu display area 91C overlap, an area, which is obtained by excluding the overlapping area from the original 3D video display area 91A, is set as a new 3D video display area 91A.

FIG. 17 shows a window 166 which is another example of the window including 3D video and a top menu.

The window 166 includes a 3D video display area 91A, a title bar display area 91B and a top menu display area 91D. The window 166 is displayed, for example, when the top menu display button 91E has been pressed on the window 161 shown in FIG. 12 (i.e. when the button 91E has been pressed during a period in which the top menu is not displayed). In the window 166, since the top menu display area 91D is provided, the 3D video display area 91A is narrowed by an area corresponding to the top menu display area 91D. Specifically, when the original 3D video display area 91A and the top menu display area 91D overlap, an area, which is obtained by excluding the overlapping area from the original 3D video display area 91A, is set as a new 3D video display area 91A.

Figure 18:
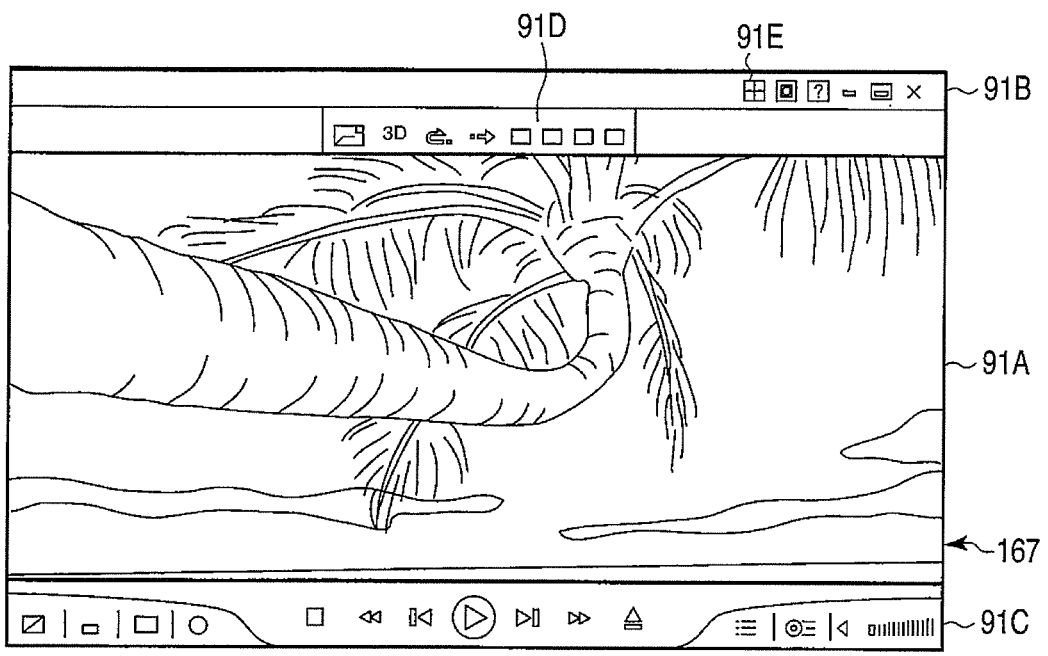
FIG. 18 shows a seventh example of the screen which is displayed by the electronic apparatus of the second embodiment.

FIG. 18 shows a window 167 which is another example of the window including 3D video, a control menu and a top menu.

The window 167 includes a 3D video display area 91A, a title bar display area 91B, a top menu display area 91D, and a control menu display area 91C. The window 167 is displayed, for example, when the top menu display button 91E has been pressed on the window 162 shown in FIG. 13. In addition, the window 167 is displayed, for example, when a mouse-over operation in the mouse-over detection area 91F has been detected on the window 163 shown in FIG. 14. In the window 167, since the control menu display area 91C and the top menu display area 91D are provided, the 3D video display area 91A is narrowed by an area corresponding to the control menu display area 91C and top menu display area 91D. Specifically, when the original 3D video display area 91A, the control menu display area 91C and the top menu display area 91D overlap, an area, which is obtained by excluding the overlapping area from the original 3D video display area 91A, is set as a new 3D video display area 91A.

Figure 19:
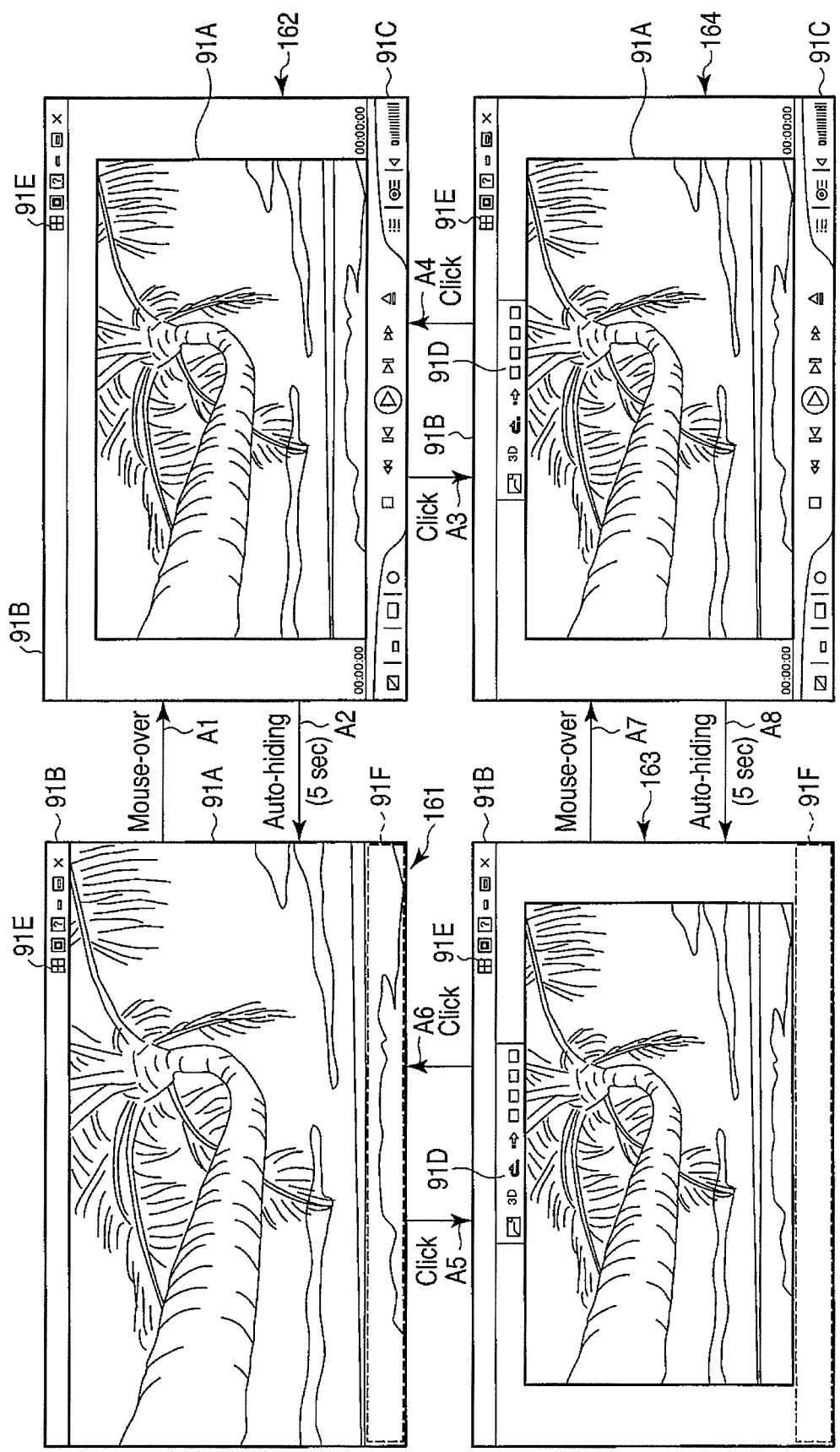
FIG. 19 is an exemplary view for describing a transition of the screen which is displayed by the electronic apparatus of the second embodiment.

FIG. 19 shows an example of a transition between the windows 161, 162, 163 and 164 in accordance with an operation by a user.

To begin with, when an mouse-over operation has been detected in the mouse-over detection area 91F while the window 161 including the 3D video display area 91A is being displayed, the window 161 transitions to the window 162 including the 3D video display area 91A and the control menu display area 91C (A1).

When the control menu is not operated for a predetermined period (e.g. five seconds) while the window 162 is being displayed, the window 162 transitions to the window 161 (A2). Specifically, the control menu is automatically hidden.

When the top menu display button 91E has been pressed while the window 162 is being displayed, the window 162 transitions to the window 164 including the 3D video display area 91A, control menu display area 91C and top menu display area 91D (A3).

When the top menu display button 91E has been pressed while the window 164 is being displayed, the window 164 transitions to the window 162 (A4).

When the top menu display button 91E has been pressed while the window 161 is being displayed, the window 161 transitions to the window 163 including the 3D video display area 91A and top menu display area 91D (A5).

When the top menu display button 91E has been pressed while the window 163 is being displayed, the window 163 transitions to the window 161 (A6).

When a mouse-over operation has been detected in the mouse-over detection area 91F while the window 163 is being displayed, the window 163 transitions to the window 164 (A7).

When the control menu is not operated for a predetermined period while the window 164 is being displayed, the window 164 transitions to the window 163 (A8). Specifically, the control menu is automatically hidden.

By the above-described transition, the window transitions according to the operations by the user. Although the example of the transition between the windows 161, 162, 163 and 164 has been described, the windows 161, 165, 166 and 167 correspond to the windows 161, 162, 163 and 164, respectively, and transition in the same manner.

Figure 20:
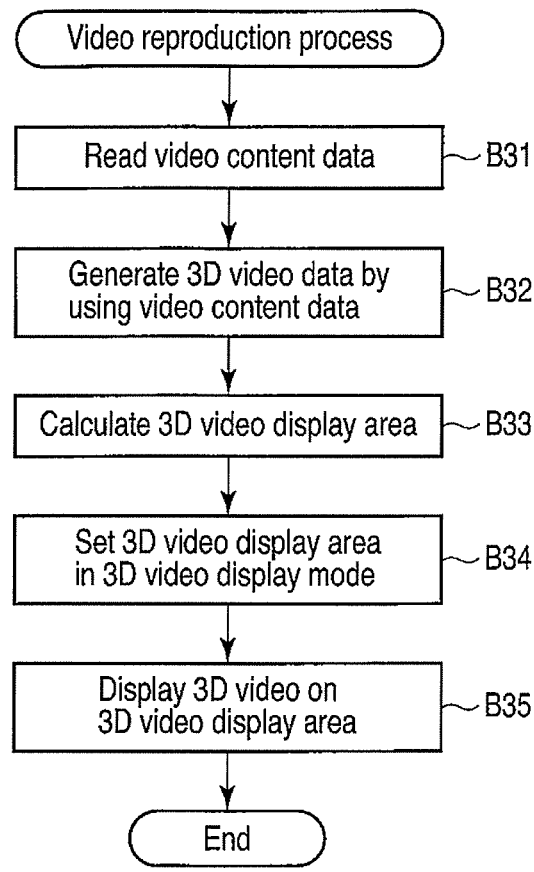
FIG. 20 is a flowchart illustrating an example of the procedure of a video reproduction process which is executed by the electronic apparatus of the second embodiment.

Next, referring to a flowchart of FIG. 20, an example of the procedure of the video reproduction process is described. In the description below, it is assumed that the video content reproduction program 13C displays 3D video on the video display area 91A by using the video content data 81.

To start with, the video read module 71 reads the video content data 81 from, for example, storage device such as the HDD 21 (block B31). The video content data 81 includes 2D video data or 3D video data. The video read module 71 outputs the read video content data 81 to the video processing module 72.

The video processing module 72 generates 3D video data by using the video content data 81 (block B32). Specifically, if the video content data 81 includes 3D video data, the video processing module 72 generates left-eye video data and right-eye video data by using the 3D video data. In addition, if the video content data 81 includes 2D video data, the video processing module 72 executes 2D to 3D conversion of the 2D video data, thereby generating left-eye video data and right-eye video data.

Then, the video processing module 72 calculates the video display area (i.e. 3D video display area) 91A for displaying the 3D video (block B33). The video processing module 72 calculates the position and size of the video display area 91A, for example, based on the generated left-eye video data and right-eye video data.

Subsequently, the 2D/3D switch module 74 sets the calculated video display area 91A (that part of the lens unit 15B, which corresponds to the video display area 91A) in the 3D video display mode (block B34). Then, the video display module 73 displays left-eye video and right-eye video on the video display area 91A by using the left-eye video data and right-eye video data (block B35).

By the above-described process, 3D video is displayed on the video display area 91A by using the video content data 81. The video content data 81 is successively reproduced on a frame-by-frame basis. When a request for displaying various menus in the window has been received while the 3D video is being displayed on the video display area 91A, the display of such menus is controlled.

Figure 21:
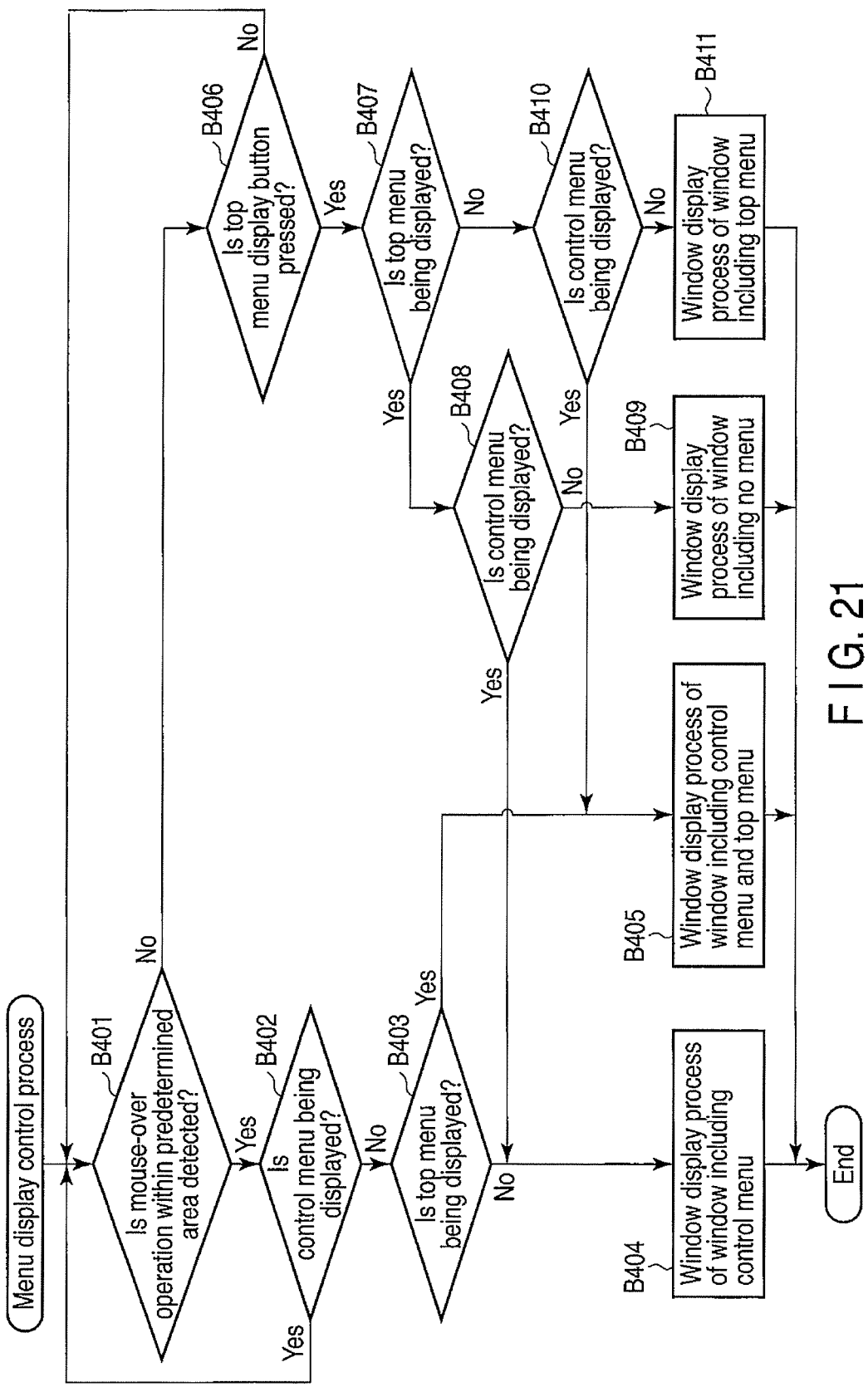
FIG. 21 is a flowchart illustrating an example of the procedure of a menu display control process which is executed by the electronic apparatus of the second embodiment.

FIG. 21 is a flowchart illustrating an example of the procedure of the menu display control process.

To start with, the event detection module 75 determines whether a mouse-over operation within a predetermined area has been detected, based on the user operation information 82, which is output by, e.g. the OS 13A (block B401). This predetermined area is, for example, a horizontal area 91F with a predetermined height in a lower part of the window 161. The event detection module 75 detects, as a mouse-over operation within the predetermined area, that a mouse cursor indicative of a position instructed by using, e.g. a mouse or touch pad 27 has entered the horizontal area 91F.

When the mouse-over operation within the predetermined area is detected (YES in block B401), the event detection module 75 determines whether the control menu 91C is already displayed (block B402). When the control menu 91C is already displayed (YES in block B402), the process returns to block B401. When the control menu 91C is not displayed (NO in block B402), the event detection module 75 determines whether the top menu 91D is already displayed (block B403).

When the top menu 91D is not displayed (NO in block B403), the menu image generation module 76, area select module 77 and menu display module 78 execute a window display process of displaying a window including the control menu 91C (block B404). Specifically, the window (screen) 162, 165 including the 3D video 91A and control menu 91C is displayed.

On the other hand, when the top menu 91D is displayed (YES in block B403), the menu image generation module 76, area select module 77 and menu display module 78 execute a window display process of displaying a window including the control menu 91C and top menu 91D (block B405). Specifically, the window 164, 167 including the 3D video 91A, control menu 91C and top menu 91D is displayed.

Meanwhile, when the mouse-over operation within the predetermined area is not detected (NO in block B401), the event detection module 75 determines whether the top menu display button 91E has been pressed, based on the user operation information 82 (block B406). When the top menu display button 91E has not been pressed (NO in block B406), the process returns to block B401.

When the top menu display button 91E has been pressed (YES in block B406), the event detection module 75 determines whether the top menu 91D is already displayed (block B407). When the top menu 91D is already displayed (YES in block B407), the event detection module 75 determines whether the control menu 91C is already displayed (block B408). When the control menu 91C is already displayed (YES in block B408), the menu image generation module 76, area select module 77 and menu display module 78 execute the window display process of displaying the window including the control menu 91C (block B404). Specifically, the window 162, 165 including the 3D video 91A and control menu 91C is displayed. The procedure of the window display process of displaying the window including the control menu 91C will be described later with reference to a flowchart of FIG. 22.

When the control menu 91C is not displayed (NO in block B408), the menu image generation module 76, area select module 77 and menu display module 78 display the window 161 including no menu (block B409). Specifically, the window 161 including the 3D video 91A is displayed. Thus, the window 161 including the 3D video 91A is displayed on the display 15 according to the same procedure as the video reproduction process which has been described with reference to FIG. 20.

Meantime, when the top menu 91D is not displayed (NO in block B407), the event detection module 75 determines whether the control menu 91C is already displayed (block 3410). When the control menu 91C is already displayed (YES in block B410), the menu image generation module 76, area select module 77 and menu display module 78 execute the window display process of displaying the window including the control menu 91C and top menu 91D (block B405). Specifically, the window 164, 167 including the 3D video 91A, control menu 91C and top menu 91D is displayed.

On the other hand, when the control menu 91C is not displayed (NO in block B410), the menu image generation module 76, area select module 77 and menu display module 78 execute a window display process of displaying a window including the top menu 91D (block B411). Specifically, the window 163, 166 including the 3D video 91A and top menu 91D is displayed. The procedure of the window display process of displaying the window including the 3D video 91A and top menu 91D will be described later with reference to a flowchart of FIG. 23.

Figure 22:
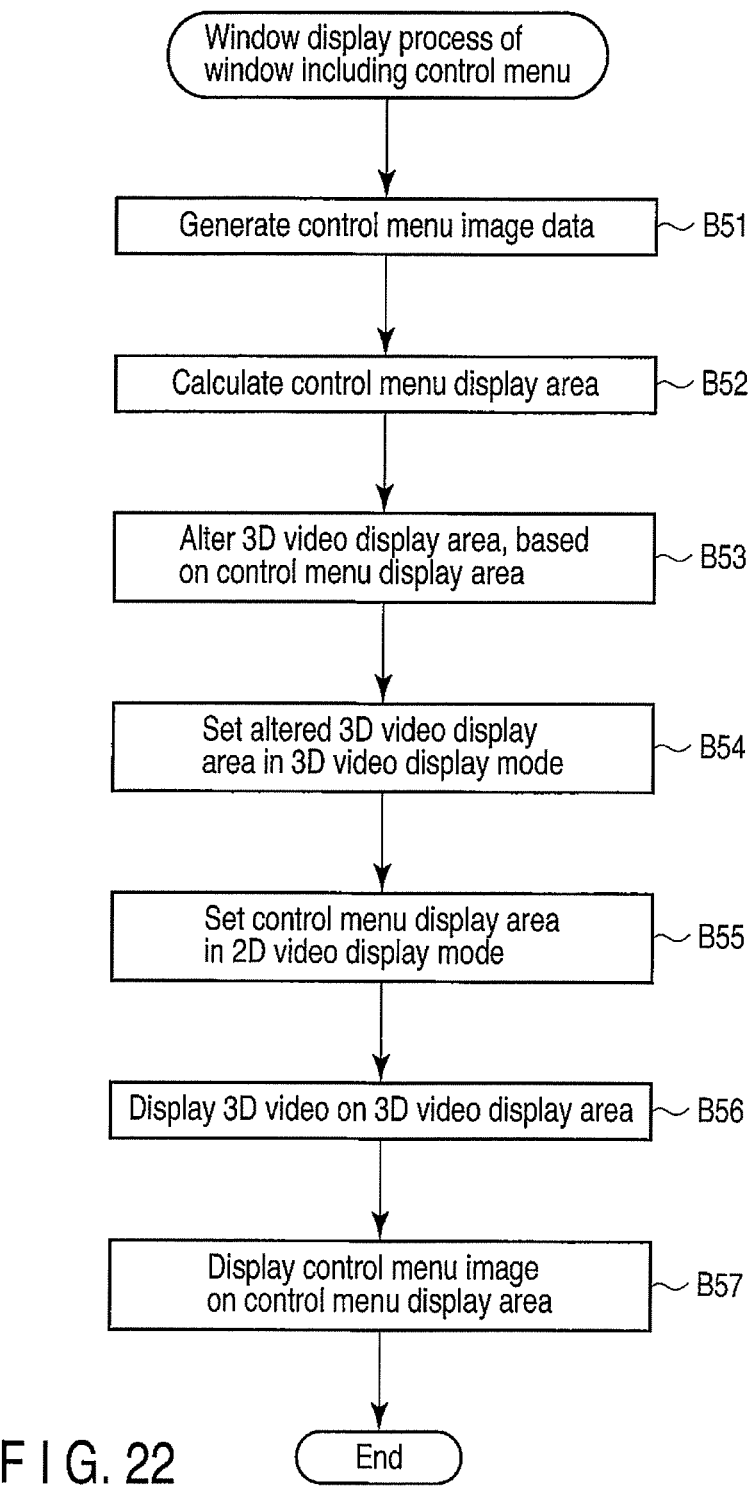
FIG. 22 is a flowchart illustrating an example of the procedure of a window display process of a window including a control menu, which is executed by the electronic apparatus of the second embodiment.

A flowchart of FIG. 22 illustrates an example of the procedure of the window display process of displaying the window including the control menu 91C.

To start with, the menu image generation module 76 generates control menu image data by using the menu data 83 (block B51). Then, the candidate area calculation module 77A calculates the control menu display area 91C, based on the menu area information 84 and the video display area 91A (block B52). Based on the calculated control menu display area 91C, the candidate area determination module 77B alters the video display area 91A (block B53). For example, when the control menu display area 91C is set such that the control menu display area 91C overlaps a part of the video display area 91A, the video display area 91A is set to be an area which is obtained by excluding the overlapping area from the video display area 91A. At this time, the video display area 91A may be set by reducing the video display area 91A while keeping the aspect ratio unchanged.

Then, the 2D/3D switch module 74 sets the altered 3D video display area 91A in the 3D video display mode (block B54). In addition, the 2D/3D switch module 74 sets the control menu display area 91C in the 2D video display mode (block B55).

Then, the video display module 73 displays 3D video on the altered 3D video display area 91A (block B56). The video display module 73 displays 3D video in accordance with the altered 3D video display area 91A. For example, the video display module 73 extracts a part of the 3D video in accordance with the size of the 3D video display area 91A, and displays the extracted part on the 3D video display area 91A. Alternatively, the video display module 73 may display 3D video by scaling down the 3D video in accordance with the size of the 3D video display area 91A.

In addition, the menu display module 78 displays the control menu on the control menu display area 91C by using the generated control menu image data (block B57). Incidentally, after the video display module 73 has displayed the video on the video display area 91A before the alteration in block B56, the menu display module 78 may write the menu image over the video in block B57, so that the 3D video is imposed on the altered 3D video display area 91A.

By the above-described process, the window 162 including the control menu 91C is displayed on the screen (display) 15.

Figure 23:
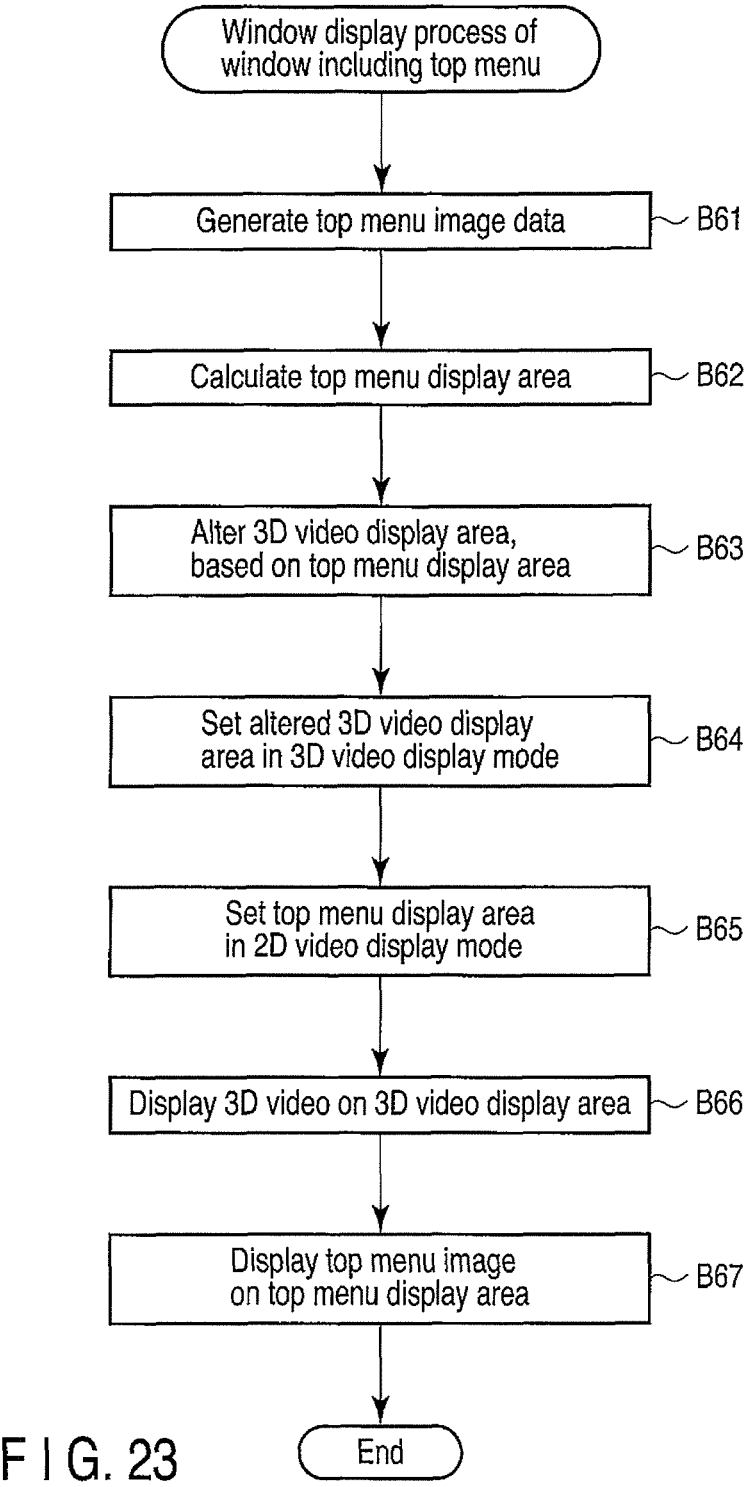
FIG. 23 is a flowchart illustrating an example of the procedure of a window display process of a window including a top menu, which is executed by the electronic apparatus of the second embodiment.

A flowchart of FIG. 23 illustrates an example of the procedure of the window display process of displaying the window including the top menu 91D.

To start with, the menu image generation module 76 generates top menu image data by using the menu data 83 (block B61). Then, the candidate area calculation module 77A calculates the top menu display area 91D based on the menu area information 84 and the video display area 91A (block B62). Based on the calculated top menu display area 91D, the candidate area determination module 77B alters the video display area 91A (block B63). For example, when the top menu display area 91D is set such that the top menu display area 91D overlaps a part of the video display area 91A, the video display area 91A is set to be an area which is obtained by excluding the overlapping area from the video display area 91A. At this time, the video display area 91A may be set by reducing the video display area 91A while keeping the aspect ratio unchanged.

Then, the 2D/3D switch module 74 sets the altered 3D video display area 91A in the 3D video display mode (block 564). In addition, the 2D/3D switch module 74 sets the top menu display area 91D in the 2D video display mode (block B65).

Then, the video display module 73 displays 3D video on the altered 3D video display area 91A (block B66). Specifically, the video display module 73 extracts a part of the 3D video, and displays the extracted part on the 3D video display area 91A. Besides, the video display module 73 may display 3D video by reducing the 3D video in accordance with the size of the 3D video display area 91A.

In addition, the menu display module 78 displays the top menu on the top menu display area 91D by using the generated top menu image data (block B67).

By the above-described process, the window 163 including the top menu 91D is displayed on the screen (display) 15.

In the meantime, when the window 164, 167 including the control menu 91C and top menu 91D is to be displayed, the control menu display area 91C and top menu display area 91D are calculated in the same manner as in the processes illustrated in FIGS. 22 and 23. Then, the video display area 91A is altered, based on the calculated control menu display area 91C and top menu display area 91D. Thereby, the window 164, 167 including the control menu 91C and top menu 91D is displayed on the screen (display) 15.

By the processes which have been described with reference to FIGS. 21, 22 and 23, the menu, which is 2D video, can be displayed in the window including the 3D video display area 91A, in accordance with the operation by the user. At this time, the 3D video display area 91A in the window can be altered in accordance with the menu that is displayed, and the size and part of the 3D video that is displayed on the 3D video display area 91A can also be altered. The user can visually recognize the menu by 2D video which is displayed on the 3D display 15. The menu is displayed in the menu display area which is determined in accordance with the coordinates of the video display area 91A and the display mode, and the menu is displayed, for example, in an area close to the video display area 91A on which 3D video is displayed. Thereby, the user can manipulate the menu at a position which hardly hinders the viewing of 3D video and is easy for visual recognition.

Besides, a context menu may be displayed in the window including the 3D video 91A. The context menu is a menu which varies according to the context of use (context of operation) by the user. For example, when an operation by the user on the screen 15 has been detected, the context menu is displayed at a position corresponding to the position of the operation (e.g. a designated position by use of the pointing device such as the mouse, touch panel or touch pad 27).

Figure 24:
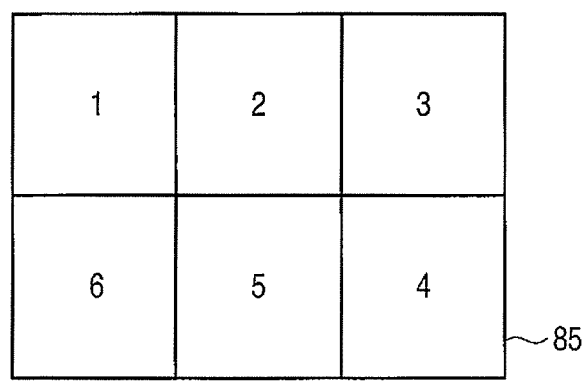
FIG. 24 is an exemplary view for explaining the determination of a screen structure by the electronic apparatus of the second embodiment.
Figure 25:
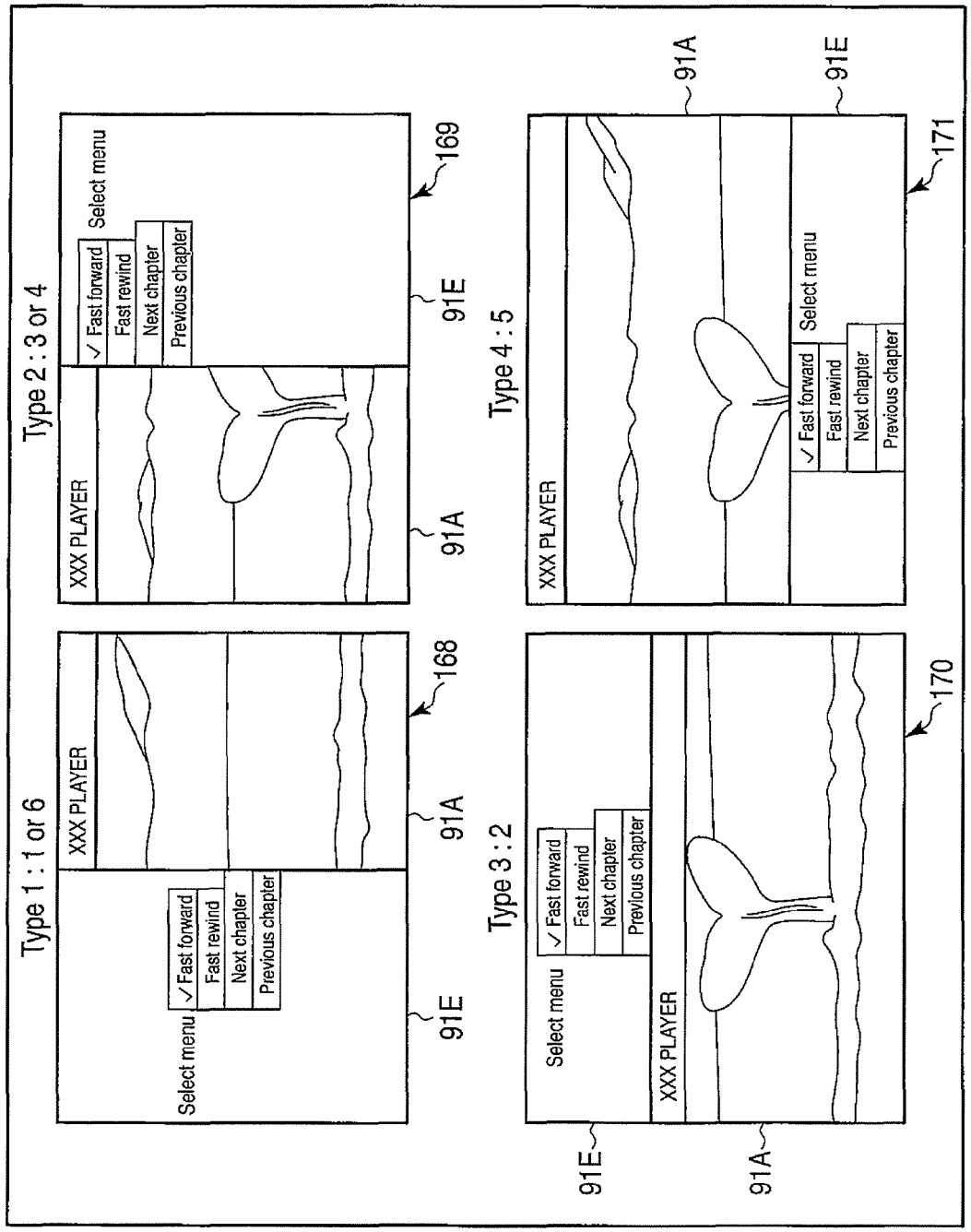
FIG. 25 is another exemplary view for explaining the determination of the screen structure by the electronic apparatus of the second embodiment.

Referring to FIGS. 24 and 25, a description is given of an example of the context menu, the display position of which is varied in accordance with the position of an operation by the user.

FIG. 24 is a diagram 85 for explaining the relationship between the position of an operation by the user and the position of display of the content menu. In the diagram 85, a window is divided into a predetermined number of areas (e.g. six areas). Depending on in which of the predetermined number of areas an operation by the user has been executed, the positional relationship between a context menu display area and a 3D video display area 91A is varied.

As shown in FIG. 25, when an operation by the user has been detected in an area "1" or an area "6" of the diagram 85 (Type 1), a window 168 is displayed. In the window 168, two areas are provided in the horizontal direction. A context menu is displayed on a left area 91E, and 3D video is displayed on a right area (video display area) 91A. Specifically, when the user has executed an operation on the left side of the screen 15, the 2D/3D switch module 74 sets the left area 91E in the 2D video display mode, and sets the right area 91A in the 3D video display mode. Then, the menu display module 78 displays the context menu on the left area 91E of the screen 15, and displays 3D video on the right area 91A of the screen 15.

When an operation by the user has been detected in an area "3" or an area "4" of the diagram 85 (Type 2), a window 169 is displayed. In the window 169, two areas are provided in the horizontal direction. A context menu is displayed on a right area 91E, and 3D video is displayed on a left area (video display area) 91A. Specifically, when the user has executed an operation on the right side of the screen 15, the 2D/3D switch module 74 sets the right area 91E in the 2D video display mode, and sets the left area 91A in the 3D video display mode. Then, the menu display module 78 displays the context menu on the right area 915 of the screen 15, and displays 3D video on the left area 91A of the screen 15.

When an operation by the user has been detected in an area "2" of the diagram 85 (Type 3), a window 170 is displayed. In the window 170, two areas are provided in vertical direction. A context menu is displayed on an upper area 91E, and 3D video is displayed on a lower area (video display area) 91A. Specifically, when the user has executed an operation on the upper side of the screen 15, the 2D/3D switch module 74 sets the upper area 91E in the 2D video display mode, and sets the lower area 91A in the 3D video display mode. Then, the menu display module 78 displays the context menu on the upper area 91E of the screen 15, and displays 3D video on the lower area 91A of the screen 15.

When an operation by the user has been detected in an area "5" of the diagram 85 (Type 4), a window 171 is displayed. In the window 171, two areas are provided in vertical direction. A context menu is displayed on a lower area 91E, and 3D video is displayed on an upper area (video display area) 91A. Specifically, when the user has executed an operation on the lower side of the screen 15, the 2D/3D switch module 74 sets the lower area 91E in the 2D video display mode, and sets the upper area 91A in the 3D video display mode. Then, the menu display module 78 displays the context menu on the lower area 91E of the screen 15, and displays 3D video on the upper area 91A of the screen 15.

In the meantime, in order to display 3D video on the area 91A, the video display module 73 displays a part of the 3D video in accordance with the position and size of the area 91A. Thus, the video display module 73 may trim the 3D video in accordance with the position and size of the area 91A. In addition, after the video display module 73 has displayed the 3D video, the menu display module 78 may write the context menu over the 3D video. Besides, the video display module 73 may display 3D video by reducing the 3D video in accordance with the position and size of the area 91A.

As has been described above, the positional relationship between the 3D video and the context menu, which are displayed in the window, can be varied in accordance with the position where the operation by the user has been executed. Incidentally, the varying of this positional relationship is applicable not only to the context menu, but also to other 2D video such as the above-described control menu, top menu or message.

Referring to a flowchart of FIG. 26, a description is given of the procedure of a display control process of controlling the positional relationship between the 3D video and context menu, which are displayed in the window, in accordance with a position where an operation by the user has been executed.

To start with, during a period in which 3D video is being reproduced by the video display module 73, etc. (block B701), the event detection module 75 determines whether an operation for displaying a menu (context menu) has been detected (block 8702). When an operation for displaying a menu has not been detected (NO in block 8702), the reproduction of 3D video is continued (block 8711).

When the operation for displaying the menu is detected (YES in block B702), the event detection module 75 determines whether the position where this operation has been executed is in the area "1" or area "6" (block B703). If the position where the operation has been executed is in the area "1" or area "6" (YES in block B703), the area select module 77 changes the display structure in the window to Type 1 (block B704). Specifically, such control is executed that two areas are provided in the horizontal direction in the window 168, the context menu is displayed on the left area 91E, and 3D video is displayed on the right area (video display area) 91A.

If the position where the operation has been executed is not in the area "1" or area "6" (NO in block B703), the event detection module 75 determines whether the position where the operation has been executed is in the area "3" or area "4" (block 8705). If the position where the operation has been executed is in the area "3" or area "4" (YES in block B705), the area select module 77 changes the display structure in the window to Type 2 (block B706). Specifically, such control is executed that two areas are provided in the horizontal direction in the window 169, the context menu is displayed on the right area 91E, and 3D video is displayed on the left area 91A.

If the position where the operation has been executed is not in the area "3" or area "4" (NO in block B705), the event detection module 75 determines whether the position where the operation has been executed is in the area "2" (block B707). If the position where the operation has been executed is in the area "2" (YES in block B707), the area select module 77 changes the display structure in the window to Type 3 (block B708). Specifically, such control is executed that two areas are provided in the vertical direction in the window 170, the context menu is displayed on the upper area 91E, and 3D video is displayed on the lower area 91A.

If the position where the operation has been executed is not in the area "2" (NO in block B707), the event detection module 75 determines whether the position where the operation has been executed is in the area "5" (block B709). If the position where the operation has been executed is in the area "5" (YES in block B709), the area select module 77 changes the display structure in the window to Type 4 (block B710). Specifically, such control is executed that two areas are provided in the vertical direction in the window 171, the context menu is displayed on the lower area 91E, and 3D video is displayed on the upper area 91A.

Following the process in each of blocks B704, B706, B708 and B710, the reproduction of 3D video is continued (block B711).

By the above-described process, the display structure in the window is controlled in accordance with the position of the operation by the user. Thereby, the user can execute a subsequent input in the vicinity of the position where the operation has been executed.

As has been described above, according to the first and second embodiments, when 3D video is displayed, it is possible to display 2D video which can easily be visually recognized by the user. The video content reproduction program 13B, 13C can control the display of a message, a menu, etc. by 2D video, which are presented to the user. The message or menu is displayed on the 2D video display area which is determined in accordance with the position and size of the video display area 40, 91A and the display mode. For example, the message or menu is displayed in an area close to the video display area 40, 91A, on which 3D video is displayed, or in a partial area of the video display area 40, 91A. Thereby, the user can confirm the message at a position which hardly hinders the viewing of 3D video and is easy for visual recognition.

All the procedures of the video reproduction process and message display control process of the first embodiment and the video reproduction process and menu display control process of the second embodiment may be executed by software. Thus, the same advantageous effects as with the embodiments can easily be obtained simply by installing a program, which executes the procedures of the video reproduction process and message display control process of the first embodiment and the video reproduction process and menu display control process of the second embodiment, into an ordinary computer through a computer-readable storage medium which stores the program, and executing this program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus which is capable of setting each of a plurality of areas in either a three-dimensional video display mode or a two-dimensional video display mode, the plurality of areas being set in a screen, the apparatus comprising:
   a three-dimensional video display module configured to display three-dimensional video on a three-dimensional video display area in the screen, the three-dimensional video display area being set in the three-dimensional video display mode;
   a candidate area calculation module configured to calculate, upon receiving a request for displaying two-dimensional video during a period in which the three-dimensional video is being displayed, a first candidate area for displaying the two-dimensional video, based on a position of the three-dimensional video display area;
   a two-dimensional video display area determination module configured to determine the first candidate area to be a two-dimensional video display area for displaying the two-dimensional video when the first candidate area falls within the screen and is set in the three-dimensional video display mode;
   a mode setting module configured to set the two-dimensional video display area in the two-dimensional video display mode;
   a two-dimensional video display module configured to display the two-dimensional video on the two-dimensional video display area; and
   a candidate area information storage configured to store one or more pieces of candidate area information indicative of a position and a priority of one or more candidate areas,
   wherein the candidate area calculation module is configured to calculate a candidate area, based on the one or more pieces of candidate area information and the position of the three-dimensional video display area, the one or more pieces of candidate area information being used in an order from the piece of candidate area information with a highest priority, the two-dimensional video display area determination module is configured to determine the calculated candidate area to be the two-dimensional video display area when the calculated candidate area falls within the screen and is set in the two-dimensional video display mode, and to determine a second candidate area to be the two-dimensional video display area when none of the candidate areas calculated by the candidate area calculation module is used as the two-dimensional video display area, the second candidate area having the highest priority among the candidate areas which fall within the screen and are set in the three-dimensional video display mode, and the mode setting module is configured to set the two-dimensional video display area in the two-dimensional video display mode when the two-dimensional video display area is set in the three-dimensional video display mode.

2. The electronic apparatus of claim 1, wherein the two-dimensional video display area determination module is configured to determine the first candidate area to be the two-dimensional video display area when the first candidate area falls within the screen and is set in the two-dimensional video display mode.

3. The electronic apparatus of claim 1, wherein the candidate area calculation module is configured to calculate a second candidate area for displaying the two-dimensional video, based on the position of the three-dimensional video display area, when the first candidate area is not used as the two-dimensional video display area, and the two-dimensional video display area determination module is configured to determine the second candidate area to be the two-dimensional video display area when the second candidate area falls within the screen and is set in the two-dimensional video display mode.

4. The electronic apparatus of claim 1, wherein the position of the candidate area is indicative of a relative position to the three-dimensional video display area.

5. The electronic apparatus of claim 1, wherein the screen comprises a lens unit comprising a plurality of lenses for emitting, in predetermined directions, a plurality of light rays corresponding to a plurality of pixels in a video image, and each of the plurality of areas is set in either the three-dimensional video display mode or the two-dimensional video display mode by using the lens unit.

6. The electronic apparatus of claim 1, wherein the two-dimensional video comprises a message.

7. The electronic apparatus of claim 1, wherein the two-dimensional video comprises a menu for operating the electronic apparatus.

8. An electronic apparatus which is capable of setting each of a plurality of areas in either a three-dimensional video display mode or a two-dimensional video display mode, the plurality of areas being set in a screen, the apparatus comprising:

a three-dimensional video display module configured to display three-dimensional video on a three-dimensional video display area in the screen, the three-dimensional video display area being set in the three-dimensional video display mode;

a candidate area calculation module configured to calculate, upon receiving a request for displaying two-dimensional video during a period in which the three-dimensional video is being displayed, a first candidate area for displaying the two-dimensional video, based on a position of the three-dimensional video display area;

a two-dimensional video display area determination module configured to determine the first candidate area to be a two-dimensional video display area for displaying the two-dimensional video when the first candidate area falls within the screen and is set in the three-dimensional video display mode;

a mode setting module configured to set the two-dimensional video display area in the two-dimensional video display mode;

a two-dimensional video display module configured to display the two-dimensional video on the two-dimensional video display area; and a three-dimensional video display area altering module configured to alter the three-dimensional video display area, based on the two-dimensional video display area, wherein the mode setting module is configured to set the altered three-dimensional video display area in the three-dimensional video display mode, and the three-dimensional video display module is configured to display the three-dimensional video on the altered three-dimensional video display area, wherein the three-dimensional video display area altering module is configured to newly set, when the two-dimensional video display area and the three-dimensional video display area overlap, the three-dimensional video display area, based on an area of the overlap, and the three-dimensional video display module is configured to display the three-dimensional video on the newly set three-dimensional video display area.

9. The electronic apparatus of claim 8, wherein the three-dimensional video display module is configured to display a part of the three-dimensional video on the newly set three-dimensional video display area.

10. The electronic apparatus of claim 8, wherein the three-dimensional video display module is configured to reduce the three-dimensional video and to display the reduced three-dimensional video on the newly set three-dimensional video display area.

11. A display control method which is capable of setting each of a plurality of areas in either a three-dimensional video display mode or a two-dimensional video display mode, the plurality of areas being set in a screen, the method comprising:

displaying three-dimensional video on a three-dimensional video display area in the screen, the three-dimensional video display area being set in the three-dimensional video display mode;

calculating, upon receiving a request for displaying two-dimensional video during a period in which the three-dimensional video is being displayed, a candidate area for displaying the two-dimensional video, based on a position of the three-dimensional video display area;

determining the candidate area to be a two-dimensional video display area for displaying the two-dimensional video when the candidate area falls within the screen and is set in the three-dimensional video display mode;

setting the two-dimensional video display area in the two-dimensional video display mode; and displaying the two-dimensional video on the two-dimensional video display area, wherein the calculating comprises calculating a candidate area, based on one or more pieces of candidate area information and the position of the three-dimensional video display area, the one or more pieces of candidate area information being indicative of a position and a priority of one or more candidate areas and being used in an order from the piece of candidate area information with a highest priority, the determining comprises determining the calculated candidate area to be the two-dimensional video display area when the calculated candidate area falls within the screen and is set in the two-dimensional video display mode, and determining a second candidate area to be the two-dimensional video display area when none of the calculated candidate areas is used as the two-dimensional video display area, the second candidate area having the highest priority among the candidate areas which fall within the screen and are set in the three-dimensional video display mode, and the setting comprises setting the two-dimensional video display area in the two-dimensional video display mode when the two-dimensional video display area is set in the three-dimensional video display mode.

12. A non-transitory computer readable medium having stored thereon a program which is executable by a computer, which is configured to be capable of setting each of a plurality of areas in either a three-dimensional video display mode or a two-dimensional video display mode, the plurality of areas being set in a screen, the program comprising instructions capable of causing the computer to execute functions of:

displaying three-dimensional video on a three-dimensional video display area in the screen, the three-dimensional video display area being set in the three-dimensional video display mode;

calculating, upon receiving a request for displaying two-dimensional video during a period in which the three-dimensional video is being displayed, a candidate area for displaying the two-dimensional video, based on a position of the three-dimensional video display area;

determining the candidate area to be a two-dimensional video display area for displaying the two-dimensional video when the candidate area falls within the screen and is set in the three-dimensional video display mode;

setting the two-dimensional video display area in the two-dimensional video display mode; and displaying the two-dimensional video on the two-dimensional video display area, wherein the calculating comprises calculating a candidate area, based on one or more pieces of candidate area information and the position of the three-dimensional video display area, the one or more pieces of candidate area information being indicative of a position and a priority of one or more candidate areas and being used in an order from the piece of candidate area information with a highest priority, the determining comprises determining the calculated candidate area to be the two-dimensional video display area when the calculated candidate area falls within the screen and is set in the two-dimensional video display mode, and determining a second candidate area to be the two-dimensional video display area when none of the calculated candidate areas is used as the two-dimensional video display area, the second candidate area having the highest priority among the candidate areas which fall within the screen and are set in the three-dimensional video display mode, and the setting comprises setting the two-dimensional video display area in the two-dimensional video display mode when the two-dimensional video display area is set in the three-dimensional video display mode.

13. A display control method which is capable of setting each of a plurality of areas in either a three-dimensional video display mode or a two-dimensional video display mode, the plurality of areas being set in a screen, the method comprising:

displaying three-dimensional video on a three-dimensional video display area in the screen, the three-dimensional video display area being set in the three-dimensional video display mode;

calculating, upon receiving a request for displaying two-dimensional video during a period in which the three-dimensional video is being displayed, a candidate area for displaying the two-dimensional video, based on a position of the three-dimensional video display area;

determining the candidate area to be a two-dimensional video display area for displaying the two-dimensional video when the candidate area falls within the screen and is set in the three-dimensional video display mode;

setting the two-dimensional video display area in the two-dimensional video display mode;

displaying the two-dimensional video on the two-dimensional video display area; and altering the three-dimensional video display area, based on the two-dimensional video display area, wherein the setting comprises setting the altered three-dimensional video display area in the three-dimensional video display mode, and the displaying three-dimensional video comprises displaying the three-dimensional video on the altered three-dimensional video display area, wherein the altering comprises newly setting, when the two-dimensional video display area and the three-dimensional video display area overlap, the three-dimensional video display area, based on an area of the overlap, and the displaying three-dimensional video comprises displaying the three-dimensional video on the newly set three-dimensional video display area.

14. A non-transitory computer readable medium having stored thereon a program which is executable by a computer, which is configured to be capable of setting each of a plurality of areas in either a three-dimensional video display mode or a two-dimensional video display mode, the plurality of areas being set in a screen, the program comprising instructions capable of causing the computer to execute functions of:

displaying three-dimensional video on a three-dimensional video display area in the screen, the three-dimensional video display area being set in the three-dimensional video display mode;

calculating, upon receiving a request for displaying two-dimensional video during a period in which the three-dimensional video is being displayed, a candidate area for displaying the two-dimensional video, based on a position of the three-dimensional video display area;

determining the candidate area to be a two-dimensional video display area for displaying the two-dimensional video when the candidate area falls within the screen and is set in the three-dimensional video display mode;

setting the two-dimensional video display area in the two-dimensional video display mode;

displaying the two-dimensional video on the two-dimensional video display area; and altering the three-dimensional video display area, based on the two-dimensional video display area, wherein the setting comprises setting the altered three-dimensional video display area in the three-dimensional video display mode, and the displaying three-dimensional video comprises displaying the three-dimensional video on the altered three-dimensional video display area,
wherein the altering comprises newly setting, when the two-dimensional video display area and the three-dimensional video display area overlap, the three-dimensional video display area, based on an area of the overlap, and
the displaying three-dimensional video comprises displaying the three-dimensional video on the newly set three-dimensional video display area.

\* \* \* \* \*